US010643271B1

(12) United States Patent
Bronson

(10) Patent No.: US 10,643,271 B1
(45) Date of Patent: May 5, 2020

(54) RETROFITTING LEGACY SURVEILLANCE SYSTEMS FOR TRAFFIC PROFILING AND MONETIZATION

(71) Applicant: Glenn Joseph Bronson, Chelmsford, MA (US)

(72) Inventor: Glenn Joseph Bronson, Chelmsford, MA (US)

( * ) Notice: Subject to any disclaimer, the term of this patent is extended or adjusted under 35 U.S.C. 154(b) by 196 days.

(21) Appl. No.: 15/682,298

(22) Filed: Aug. 21, 2017

Related U.S. Application Data

(63) Continuation-in-part of application No. 14/599,340, filed on Jan. 16, 2015, now abandoned.

(60) Provisional application No. 61/928,820, filed on Jan. 17, 2014, provisional application No. 62/507,983, filed on May 18, 2017.

(51) Int. Cl.
| | |
|---|---|
| *G08G 1/01* | (2006.01) |
| *G06Q 30/06* | (2012.01) |
| *G08G 1/017* | (2006.01) |
| *G06K 9/00* | (2006.01) |
| *G06F 21/10* | (2013.01) |

(52) U.S. Cl.
CPC ........ *G06Q 30/0645* (2013.01); *G06F 21/10* (2013.01); *G06K 9/00771* (2013.01); *G08G 1/0175* (2013.01)

(58) Field of Classification Search
CPC ............................ G06Q 20/145; H04N 7/181
See application file for complete search history.

(56) References Cited

U.S. PATENT DOCUMENTS

| 6,903,778 B1 * | 6/2005 | Kaku | H04N 5/232 |
| | | | 348/333.13 |
| 6,970,183 B1 * | 11/2005 | Monroe | G08B 7/062 |
| | | | 348/143 |
| 7,327,396 B2 * | 2/2008 | Schultz | H04N 5/225 |
| | | | 348/207.1 |

(Continued)

OTHER PUBLICATIONS

SPI/Microwire-Compatible UART with Integrated True Fail-Safe RS-485/RS-422 Transceivers. Maxim Integrated Products. MAX3140. Rev. 1, 2010.

(Continued)

*Primary Examiner* — Joshua T Kennedy
(74) *Attorney, Agent, or Firm* — Adibi IP Group, PC; Amir V. Adibi

(57) ABSTRACT

An acquisition content profiling device (ACPD) comprises a power module, a controller module, and an analog-to-digital converter (ADC) module. The ACPD has a terminal that receives a signal from an acquisition content system having an enclosure. For example, the acquisition content system is an analog video camera system, and the ACPD fits within the enclosure and is powered entirely via the video camera system. The ACPD receives acquired content from the video camera system via the analog terminal. The ADC module converts the acquired content into a digital signal, and the digital signal is supplied onto the controller module. The controller module has dedicated hardware that detects motion, detects features according to a feature profile (such as license plate information), segments the acquired content to protect private information, marks the acquired content with identifying information of the owner of acquired content, and distributes the processed content to a third-party.

17 Claims, 28 Drawing Sheets

(56) References Cited

U.S. PATENT DOCUMENTS

| | | | | |
|---|---|---|---|---|
| 8,204,273 | B2* | 6/2012 | Chambers | G08B 13/19613 |
| | | | | 382/103 |
| 9,000,903 | B2* | 4/2015 | Bowers | B60Q 1/00 |
| | | | | 340/435 |
| 9,224,045 | B2* | 12/2015 | Land | H04N 19/46 |
| 2004/0143602 | A1* | 7/2004 | Ruiz | G08B 13/122 |
| 2008/0297599 | A1* | 12/2008 | Donovan | G11B 27/105 |
| | | | | 348/143 |
| 2010/0079649 | A1* | 4/2010 | Ayraud | H04N 5/3698 |
| | | | | 348/308 |
| 2011/0058034 | A1* | 3/2011 | Grass | G08B 13/19656 |
| | | | | 348/143 |
| 2011/0187870 | A1* | 8/2011 | Chang | G06F 17/00 |
| | | | | 348/207.1 |
| 2011/0276396 | A1* | 11/2011 | Rathod | G06Q 10/00 |
| | | | | 705/14.49 |
| 2013/0083198 | A1* | 4/2013 | Maslan | H04N 7/188 |
| | | | | 348/155 |
| 2016/0042621 | A1* | 2/2016 | Hogg | G06K 9/00771 |
| | | | | 348/155 |
| 2018/0302690 | A1* | 10/2018 | Tran | H04N 21/435 |

OTHER PUBLICATIONS

Raspberry Pi Compute Module (CM1), Module 3 (CM3), Module 3 Lite (CM3L) Datasheet. Raspberry Pi (Trading) Ltd. Version 1.0, Oct. 2016.

USB2.0 TV Tuner/Video Capture Controller. Syntek Semiconductor Co., Ltd. STK1160 Data Sheet. Rev. 1.2, Feb. 24, 2006.

9-bit video input processor. Philips Semiconductors. SAA7113H Data Sheet. Jul. 1, 1999.

\* cited by examiner

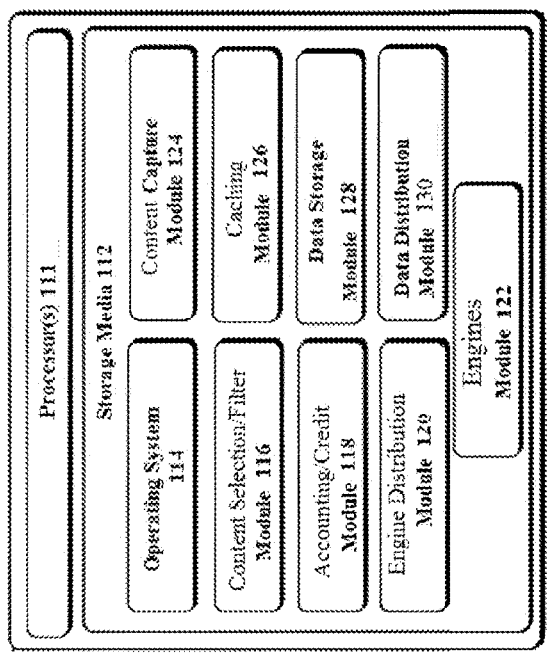
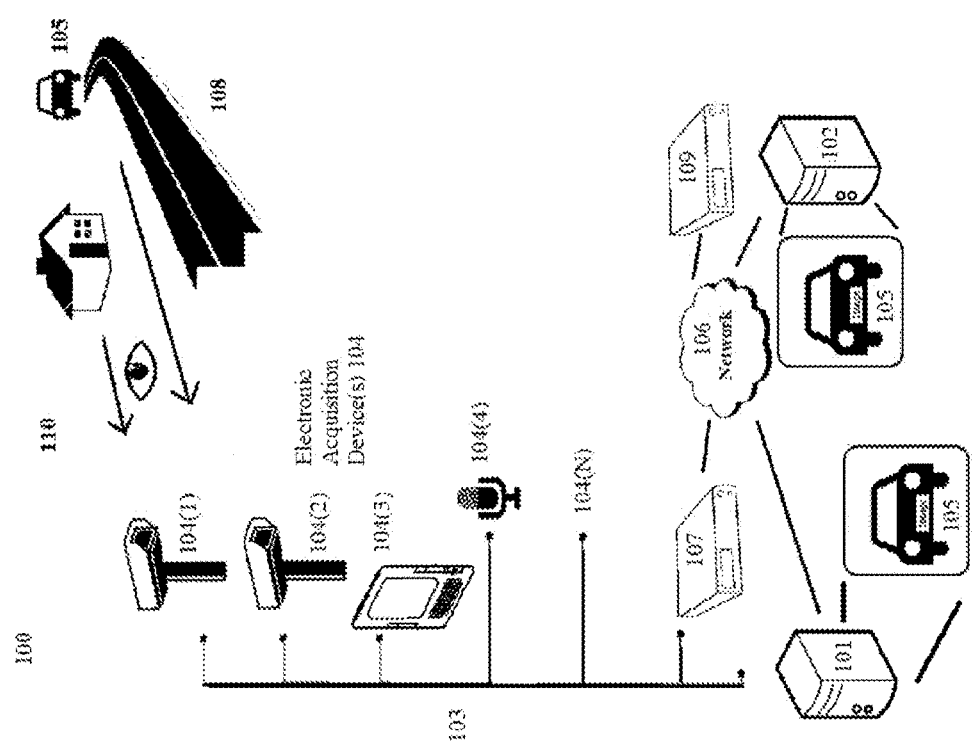
FIG. 1

ANALOG VIDEO CAMERA SYSTEM

ANALOG VIDEO CAMERA SYSTEM

RETROFITTING VIDEO CAMERA SYSTEM WITH ACPD

COUPLING ONLY VIDEO CONDUCTOR TO ACPD

COUPLING VIDEO AND AUDIO CONDUCTORS TO ACPD

THIRD
DIMENSION
(FOR EXAMPLE,
5 CENTIMETERS)
234

STATE DIAGRAM FOR THE ACQUISITION
CONTENT PROFILING DEVICE STATE MACHINE

USING THE ACQUISITION CONTENT PROFILING
DEVICE TO DETECT MOTION

USING THE ACQUISITION CONTENT PROFILING
DEVICE TO DETECT FEATURES

USING THE ACQUISITION CONTENT PROFILING
DEVICE TO DETECT FEATURES

USING THE ACQUISITION CONTENT PROFILING
DEVICE TO DETECT FEATURES

ACQUISITION CONTENT PROFILING DEVICE
DETECTS MOTION AND NO FEATURE

ACQUISITION CONTENT PROFILING DEVICE PERFORMS
SEGMENTATION AND MARKING OF ACQUIRED CONTENT

ACPD SEGMENTS AND MARKS IMAGE T0

ACPD SEGMENTS AND MARKS IMAGE T1

ACPD SEGMENTS AND MARKS IMAGE T2

US 10,643,271 B1

RETROFITTING LEGACY SURVEILLANCE SYSTEMS FOR TRAFFIC PROFILING AND MONETIZATION

CROSS-REFERENCE TO RELATED APPLICATION

This application is a continuation-in-part of, and claims the benefit under 35 U.S.C. § 120 from, nonprovisional U.S. patent application Ser. No. 14/599,340, entitled "Infrastructure which extends the use of surveillance systems for traffic profiling along public and private access ways," filed on Jan. 16, 2015. U.S. patent application Ser. No. 14/599,340 claims the benefit under 35 U.S.C. § 119 from provisional U.S. patent application Ser. No. 61/928,820, entitled "Infrastructure which extends the use of surveillance systems for traffic profiling along public and private access ways," filed Jan. 17, 2014. This application also claims the benefit under 35 U.S.C. § 119 from provisional U.S. patent application Ser. No. 62/507,983, entitled "Graphics Processing Module For Authentication and Tracking of Pictures and Videos From Cameras," filed May 18, 2017. The subject matter of each of the foregoing documents is expressly incorporated herein by reference.

REFERENCE TO ASCII TEXT FILE APPENDIX

This application includes an ASCII text file appendix containing source code to software that embodies the inventions described herein. The software code is software implementations of a motion detect circuit, a feature detect circuit, and image segmentation and marking engine. A portion of the disclosure of this patent document contains material that is subject to copyright protection. All the material on the ASCII text file appendix is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights. The ASCII text file appendix includes one text file created on Jul. 16, 2017 and readable in the MS-Windows operating system. The text file is named "motion_and_feature_detect-.txt", is 33 kilobytes large, and is an ASCII version of Java code that configures the controller 225 shown in FIG. 18 to perform environmental calibration, motion detect, feature detect, and image segmentation and marking functionality. The Java code in the ASCII text file appendix incorporates Xuggler source code used to uncompress, modify, and re-compress media files or streams and is downloadable from the following URL: http://www.xuggle.com/xuggler/.

TECHNICAL FIELD

The described embodiments relate to surveillance systems, and more particularly to retrofitting existing surveillance systems with dedicated hardware profiling modules.

BACKGROUND INFORMATION

The availability of affordable cameras, low cost computer systems, image processing technology, and the internet has resulted in widespread deployment of surveillance systems for security and monitoring purposes. These surveillance systems are extremely effective when deployed along the perimeter of properties, in which there is most likely access ways such as roads, paths, and sidewalks to and from the property, and adjacent to the property. Even though they may be deployed in this fashion, surveillance systems are typically deployed as a capital investment and cost overhead and not utilized as a source of valuable data or as a revenue stream.

At the same time, affordable cameras, low cost computers systems, image processing technology, and the internet has resulted in a large deployment of vehicle identification imaging technologies such as ANPR (Automated Number Plate Recognition) and LPR (License Plate Recognition). License plate recognition systems have been typically deployed by municipalities and government for tolls, vehicle registration, and law enforcement. The private sector has primarily used ANPR for vehicle parking and security purposes.

Affordable cameras, low cost computers systems, image processing technology and computer networks have also resulted in deployments of recognition systems which can track the movement of humans and even identify persons based on their visual characteristics. Municipalities comprised of urban centers with large amounts of foot traffic have typically deployed these for pedestrian traffic studies for urban planning. Government buildings and high security checkpoints such as airports and customs have deployed human recognition systems for counter terrorism and law enforcement.

All these surveillance systems: security, ANPR, human recognition, and other applications are typically deployed as separate, dedicated systems. They fall short in their ability to be leveraged easily for other purposes. The most prevalent in the private and public sector being deployment of security surveillance systems which are typically deployed as a capital expenditure, which means they are an operating overhead, perhaps even demanding fee based maintenance and subscription. Prior art lacks the ability to easily leverage these systems deployed for private, residential, or commercial surveillance as traffic profiling systems.

SUMMARY

This solution is an infrastructure that facilitates being able to do this quickly, cheaply, securely and easily, while at the same time allowing the surveillance system to actually monetize the data it gathers. This disclosure is directed toward techniques that allow government, companies, individual persons or other entities, to easily leverage surveillance systems previously designed and deployed as security systems and other applications, to supply data that can generate revenue for their owners. It allows new and existing surveillance systems to be converted to multiple use systems.

Any object or event that is captured by a camera or other acquisition device in a surveillance system is content. Traffic is content which has a behavior that can be quantified and categorized in a profile. These profiles are of great value not only to law enforcement and government, but also commercial businesses and organizations which do business along or over these roads and access ways. Some examples that are valuable to commercial business are vehicle and pedestrian traffic profiles: detailed traffic counts, direction and type of traffic, types and make of vehicles, and repeat travelers. All this data is of value to retail companies, franchises, service companies, and other types of businesses to understand their customer base at a given location, whether they plan to locate their establishments directly alongside an access way or are simply planning their resource strategies for new customer acquisition.

A store owner, of say a clothing store with a display window, may use the system to determine what time of day female foot traffic is highest in front of his establishment, and modify his window display accordingly. An owner of a gas station or convenience store may use the system to determine which vehicles that pass in front of his establishment each day are repeat travelers in each direction. Knowing which of these customers pull into his establishment and which do not, he may decide to lower his fuel prices at just that time of day to lure more of them in.

The infrastructure has the ability to configure and turn on and off filters which select acquisition sources, images, and data which will be exposed to other interested parties. This is key functionality which allows the surveillance system at a site to be utilized for multiple purposes, as well as generate revenue. A security system being used for ANPR and vehicle traffic profiling is one such example of multi-use, but this solution may also allow that same security system to be used for other types of traffic profiling as well.

A government or municipality may use the infrastructure to access a private surveillance system at a site in its search for a particular automobile. Law enforcement or a town may not have had the resources to place a surveillance system in that location, but through this infrastructure may have access to the content and data based on agreement with the owners. This solution will allow them access to specific cameras, data and or images based on configuration. A municipality having a town fair or other public event may use this solution to leverage surveillance systems at residences or companies along the various routes to track the flow of pedestrians, traffic, parking, and conduct security. A municipality or other entity may use the infrastructure to time share and gain access to mobile surveillance being operated by state law enforcement, such as those found in police cars with cameras and LPR systems which examine and identify traffic.

Any number of industry standard security companies which, under contract, remote monitor premises can access the system with this solution. All surveillance content need not leave the site over a network connection to these companies, but only select images, sources, vehicle IDs and profiling information facing the public access way may be granted to them, as per agreement between the site owner and the security company. The security company may be conducting a traffic survey for a client, or participating in a wider location hunt for a particular vehicle. By gaining access to the surveillance system on a controlled and agreed upon basis, it can carry out these tasks.

The solution is an infrastructure that handles the flow of surveillance system content and data in a manner which has privacy control of outside parties and revenue generation in mind: Configuration and support for contract based, subscription based or event based compensation to the owner/administrator of the surveillance system of the site is provided in return for making specific content and data available.

In various embodiments, this infrastructure is not limited to private security surveillance systems or static site deployments. It can operate within other types of surveillance systems such as mobile LPR/ANPR systems found in police cars, and control access and data from government owned cameras alongside access ways. This infrastructure may be used to profile traffic crossing easements, such as at railroad crossings, pedestrian bridges, hiking and rail trails. In various embodiments this infrastructure may be used to profile watercraft under and along waterways, boat launches, and other water access easements. This infrastructure is programmable and configurable to use any custom or open source recognition techniques to analyze content obtained by the surveillance system.

In other embodiments this infrastructure may be used to profile any living organisms such as animals, livestock, or wild game along access ways. In various embodiments this infrastructure may be used to profile the growth and development of plant life and vegetation in its field of view. In various embodiments this infrastructure can be used to profile audio content as well as any form of image content at the surveillance site. This infrastructure is programmable and configurable to profile content from any peripheral or built in acquisition devices at the surveillance site. Several circuit implementations and other embodiments are disclosed in the detailed description. Numerous ways of realizing traffic profiling systems are also disclosed in the detailed description.

In another example, an acquisition content profiling device (ACPD) comprises a power module, a controller module, and an analog-to-digital converter (ADC) module. The ACPD includes at least one analog terminal that receives an analog signal from an acquisition content system having an enclosure. In one example, the acquisition content system is an analog video camera system, the ACPD fits within the enclosure of the video camera system, and the ACPD is powered entirely via the video camera system. The power module is supplied by an output supply of the video camera system. The power module, in turn, supplies the controller module and the ADC module from the received supply that is output by the video camera system. The ACPD receives acquired content from the video camera system via the at least one analog terminal. The ADC module converts the acquired content into a digital signal. The digital signal is then supplied onto the controller module. The controller module detects motion, detects features according to a feature profile (such as license plate information), segments the acquired content according to a segmentation profile, and marks the acquired content thereby associating the acquired content with the owner of acquired content. The controller module performs the motion and feature detection, segmentation, and marking functionality with dedicated hardware. The controller module performs the motion and feature detection, segmentation, and marking functionality without performing any processing of the acquired content outside of the ACPD.

In one example, a first entity that owns the video camera system retrofits the system to include the ACPD. After configuration, the ACPD causes an accessible portion of the acquired content to be supplied to a third entity via an acquired content distribution system operated by a second entity. The second entity manages an acquired content distribution system. A third entity contracts either directly with the first entity that owns the camera system or through the second entity to obtain the publicly accessible portion of the acquired content. The third entity typically provides financial compensation as consideration in exchange. Only acquired content captured by the camera system that has been processed by the ACPD is accessible to third parties. The ACPD ensures that the masked portions of the video acquired content will not be accessible to third parties. The ACPD also ensures that the owner of the content acquisition device is compensated for providing the content.

Further details, embodiments, methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 is a diagram of an illustrative computing environment in which one or more embodiments of the infrastructure which extends the use the use of surveillance systems for traffic profiling along public and private access ways may be implemented.

DETAILED DESCRIPTION

Figure 2:
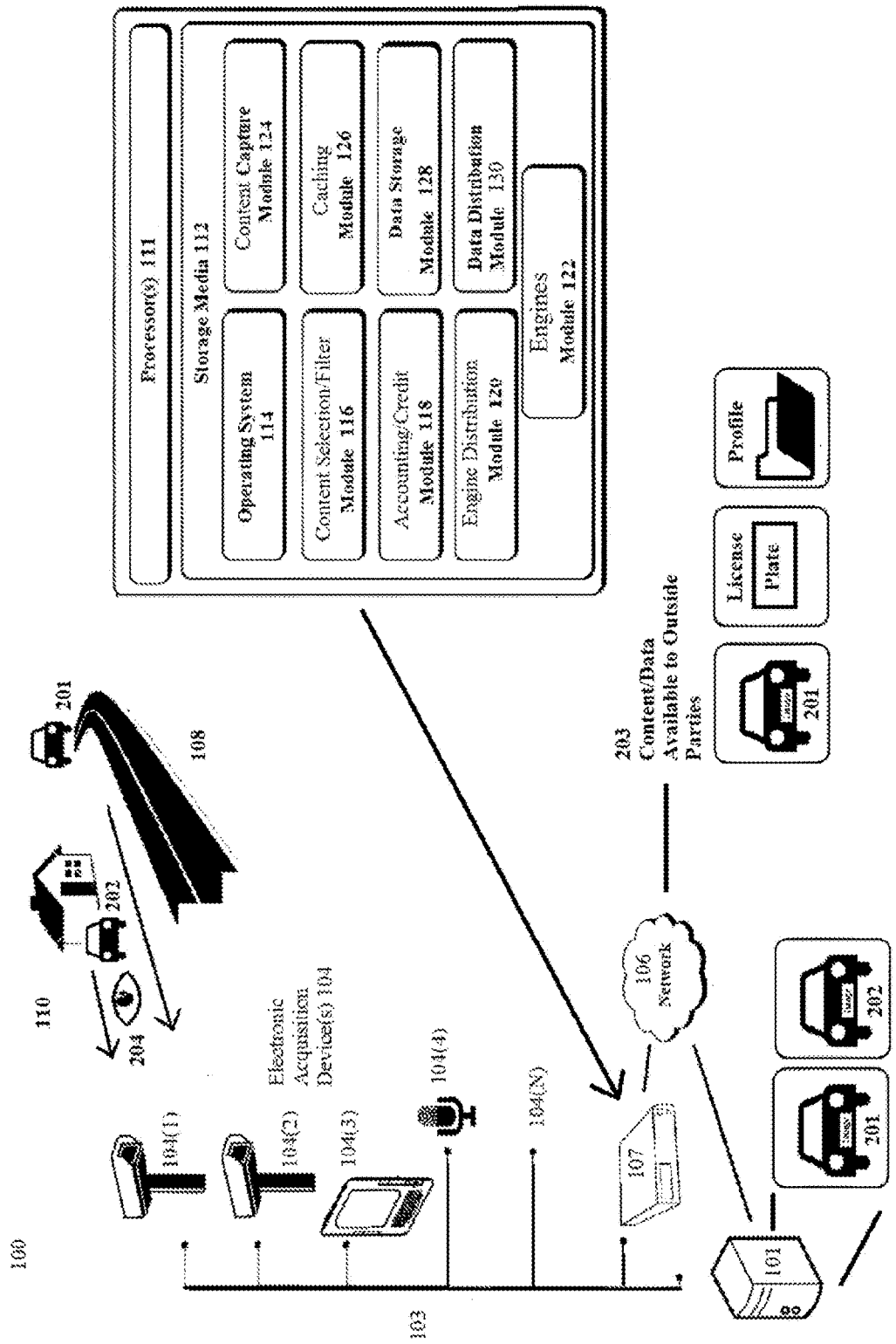
FIG. 2 is a diagram of a deployment in which one or more embodiments of the use of the infrastructure which extends the use surveillance systems for traffic profiling along public and private access ways may be deployed.

Reference will now be made in detail to background examples and some embodiments of the invention, examples of which are illustrated in the accompanying drawings.

FIG. 1 shows an illustrative computing environment 100 in which in which one or more embodiments of the infrastructure for the use of surveillance systems for traffic profiling along public and private access ways may be implemented. The computing environment 100 may include server 101, computing platform 107 and a plurality of acquisition devices 104 that are communicatively connected by an analog or digital network 103. It may also include offsite computing platform 109 and server 102 connected by an analog or digital network 106. The entire sample surveillance site for this illustration will be referred to as 110.

The network 106 may be a local area network "LAN", a larger network such as a wide area network "WAN", or a collection of networks, such as the internet. Protocols for network communication, such as TCP/IP, may be used to implement the network 106. Although embodiments are described herein as using a network such as the Internet, other distribution techniques may be implemented that transmit information via memory cards, flash memory, or other portable memory devices.

The electronic acquisition devices 104 may be implemented in any number of ways. In FIG. 1 illustration, the electronic devices include an analog camera 104(1), a digital camera 104(2), a mobile phone camera 104(3), an audio microphone 104(4), or any combination of audio and image acquisition devices that can capture a series of images, video or audio. These devices may be visible or hidden. These are merely samples, and any 104(N) other electronic devices that are equipped with a network communication component, data acquisition components, data processing components or electronic display component may be employed.

The camera devices and audio devices 104 may be analog or digital and attached to an analog recording device or a digital recording device such as a computer file server 101 by means of an analog or digital connection 103. The recording devices may also be located offsite 102 connected by means of a network 106.

107 is a computer based platform running a sequence of software instructions with configuration settings that allows selection of camera sources, selection of images and other content, and generation of traffic profiles and data; all of which may be treated separately from other content acquired by the surveillance system at the site. The sequence of instructions also determines where the separated content, profiles, data, and other information will be sent: either directly to outside parties or to a series of software instructions which constitutes an engine.

"Content" from here forward shall be defined as anything captured by the acquisition device(s) 104(n) of a surveillance system. Some examples of content are images, video, audio, geolocation, and motion. These examples are for illustration only, and depending on the type of surveillance system may include other forms of captured information.

"Engine" from here forward shall be defined as a computer implemented method that processes and analyzes the content produced by the surveillance system and produces output information.

"Traffic" from here forward shall be defined as content that has behavior that can be identified, quantified, categorized, and have metrics applied to describe it.

"Data" from here forward shall be defined as information deemed as being of interest to the site owner or outside parties.

"Traffic Profile" from here forward shall be defined as data associated with a specific category or type of traffic. Some examples of traffic profiles include detailed traffic counts, direction and type of traffic, types and make of vehicles, gender and frequency of repeat travelers. These examples are for illustration only, and profiles may be generated for other types of traffic with corresponding, quantifiable metrics.

"Multi-use" or multiple use surveillance system, from here forward, shall be defined as any surveillance system that can be configured with this solution to provide content or data for purposes which may or may not have been anticipated when the system was deployed or installed.

109 is a computer based platform running a sequence of software instructions that includes the functionality found in 107, but is located offsite and communicates with 107 by means of 106 or other network. 109 may have additional functionality, such as but not limited to, server functionality to handle communication with multiple instances of 107, as well as the ability to host licensed software.

From here forward, "site" shall be defined as the physical location of a surveillance system. "Onsite" shall be defined as the physical location of a surveillance system which captures content from a group of acquisition devices 104 located at that location. "Offsite" shall be defined as another physical location which may or may not have a separate surveillance system with its' own set of acquisition devices 104.

The site need not be a permanent installation. For example, it may be a mobile surveillance system such as the ones used by law enforcement in police cars and other vehicles parked along roads and access ways for traffic studies and ANPR.

If any of the acquisition devices 104 are analog, a conversion device may be built inside the devices themselves or located externally on 103 to convert their output to digital format that can be fed to 107 or 109. The conversion device(s) may also be located in storage servers 101 or 102.

Examples of content generated by 104 may be video, pictures and/or audio. This may have been obtained by 104 in any number of ways. Some examples are: by means of a legacy deployed security system, dedicated ANPR or pedestrian camera, microphones, or other peripheral or built in acquisition devices on the premises. Content contributed by 104 may be from one or more available devices 104 offsite, obtained by means of the internet, or a group of other shared electronic devices available via a network such as 106. Content such as an image of a captured vehicle 105 may also already be on onsite persistent storage, such as a legacy DVD recording or tape recorder, or on a computer camera roll, server, or file system 101. Content might also be available from offsite persistent storage, such as a legacy DVD recording or tape recorder, or on a computer camera roll, server, or file system 102 available via a network such as 106.

Implementation of the infrastructure which extends the use of surveillance systems for traffic profiling along public and private access ways may be entirely on-site on 107, split between 107 and 109 across a network such as 106, or entirely offsite on 109.

Figure 3:
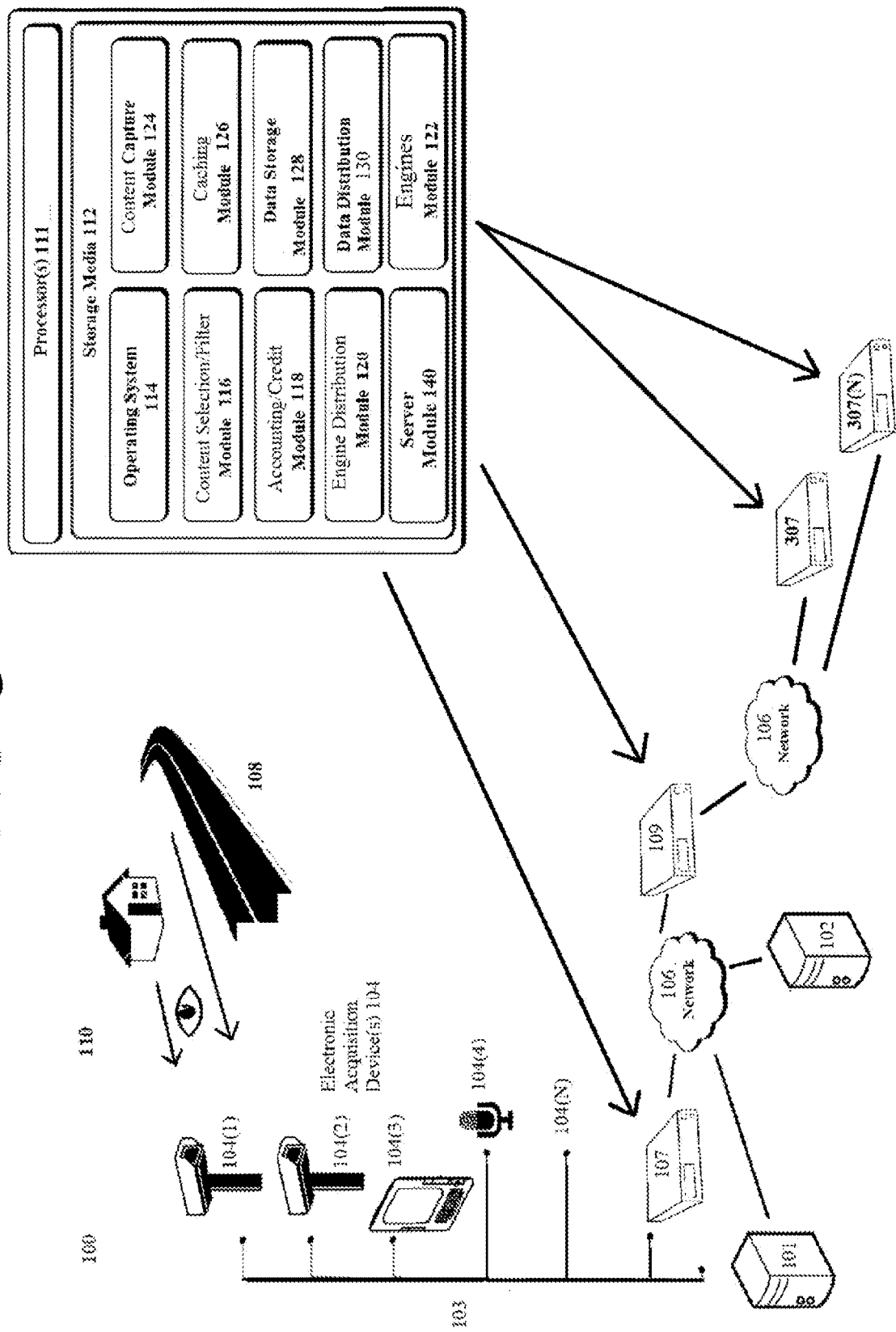
FIG. 3 is a diagram of an illustrative detail of the computing environment in which one or more embodiments of infrastructure which extends the use of surveillance systems for traffic profiling may be configured for a mixed mode site implementation.

FIG. 3 illustrates a split mode implementation of the solution, utilizing functionality on 109 if it is present. As Illustrated in FIG. 3, the server 107 may include one or more processors 111 and storage media 112 as well as other modules. It includes an operating system 114 that supports the modules that include routines, components, objects and data structures that cause 107 to perform particular tasks. Certain modules are shown, including Content Selection Filter 116, Accounting Credit 118, Engine Distribution 120, Engine 122, Content Capture 124, Caching 126, Data Storage 128, and Data Distribution 130.

109 is a computer based platform running a sequence of software instructions that includes the functionality found in 107, but is located offsite and communicates with 107 by means of 106 or other network. 109 may have additional functionality, such as server functionality in server module 140 to handle communication with multiple instances of 107 at various sites as show as 307(N), as well as the ability to host licensed software.

Data is information deemed as being of interest to the site owner or outside parties, and may be of the form of selected content captured directly by the surveillance system itself, information output from the engines in 122, or any combination of the two. Data is used to generate the traffic profile. The traffic profile itself is considered data.

Content captured by the onsite acquisition system, such as video and audio in this example, are fed to content capture module 124. This module may receive the captured content from the devices 104, or access them indirectly off of a storage server 101 via networks 103 or 106.

A sequence of software instructions within content selection filter module 116 access content in capture module 124 and select, filter, and examine the content, thus allowing for separation of content that will be fed to the engines and that which will not be. Configuration of these instructions may select content based on which device in 104 acquired it, or use software to filter specific content that is desired to be fed to specific engines in module 122 for further examination. The filtering by 116 not only allows better use of bandwidth for content submitted to the engines, but is also critical for security and privacy that may have been agreed upon between the site owner/administrator and outside parties. It may act as a privacy filter which permits only specific content to be examined by outside parties other than the site owner and administrators. For example, the filter may be configured for data to flow to the engine and outside parties only on certain days and time periods as per agreed upon by contract. The actual routing of content may be accomplished by either the content selection filter 116 or the data distribution module 130 tagging the content on an existing onsite media storage device 101, or actual routing of the content to separate, dedicated storage devices onsite or sent over a network to offsite 102.

The programmable recognition engine module 122 is a sequence of software instructions running on a microprocessor platform or dedicated hardware that may reside onsite running on 107 or offsite at 109. One or more engines may reside in module 122, and their functionality depends on the nature of the content to be examined. The engine(s) may be programmed with one or more recognition profiles remotely over the network 106, from offsite 109 in a split configuration, or be configured onsite directly at 107. If an engine is not presently available onsite on 107 or offsite on 109 for any reason, the content selection filter 116 will place it in cache module 126 for later processing. Depending on how it has been configured for particular devices 104, the selection filter module 116 need not submit to an engine on 122, but may submit acquired content directly to data distribution module 130.

Module 120 manages the loading, running and access to engines running on server 107 or access to them if located elsewhere on 109 reachable over a network such as 106. If local on 107, the engine(s) would likely reside in 122. Engines are specific to types of content, and may be custom, open source, or proprietary. Some examples of engines are vehicle recognition, license plate recognition (LPR) and various other image recognition technologies. If an engine is licensed and proprietary it might be running on a network at an offsite location such as 109. Module 120 supports access of content to and from these onsite and offsite engines for specific content as deemed of interest by module 116.

When content is submitted to the engines, their output will be information which will be used to further determine if the content was of interest, and may be sent to 130 accompanied by the original content acquired by the acquisition system itself. This data distribution module 130 will determine whether it is data that is to be discarded, passed offsite at a determined time to 109, to 102 or other outside party servers such as those used by municipalities, security companies, or other entities. 130 uses both industry standard or proprietary protocols and API's (application program interface) software instructions to communicate with these outside servers. The data may also be stored in module 128 for transfer to a physical storage device onsite or retrieved by means of network 106. The data distribution module 130 determines when, how, and what to do with the data, and communicates its decision to the accounting/credit module 118. Module 118 tallies the results and statistics about the data accordingly. Module 128 may also be used as caching in case the devices 109 or 102 are not immediately available via network 106.

Data Storage Module 128 may take the form of electronic ram, persistent storage, or other form of memory on the device.

In various embodiments configuration of 107 need not be done entirely on 107 but also via 109 or by a remote, mobile device connected to 107 by means of a network such as 106.

In this illustrative example, information in and out of the infrastructure in the form of content and data is implemented in four configurable modules within 107: The content selection filter module 116 which handles the content acquired by the acquisition system, engine distribution module 120 which handles content and information flow to and from the various engines, the data distribution module 130 which determines what is data and where that data is to be sent, and the accounting credit module 118 which keeps track of the generated data and assigns credit to specified parties for it. In various embodiments the same configured functionality found in these modules may be accomplished in any number of modules located in any number of computing platforms such as 107 and 109.

In various embodiments, the infrastructure which extends the use of surveillance systems for traffic profiling along public and private access ways can be located on computing platforms at the surveillance site other than 107 or 109. The computer implemented methods which comprise the solution may reside within the acquisition devices themselves in any of 104(n), or on any existing hardware in the surveillance system such as onsite server 101 or offsite server 102.

Figure 4:
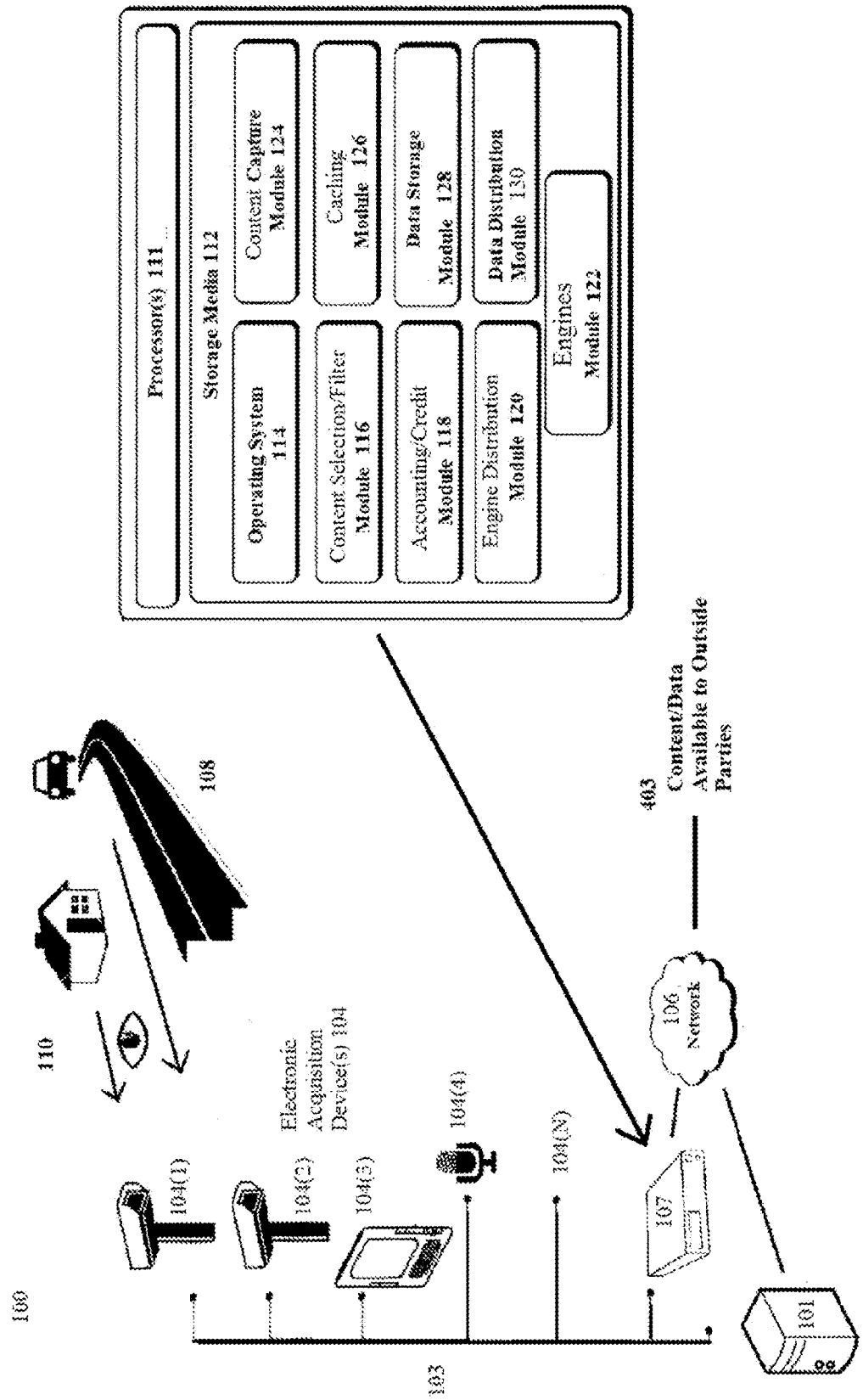
FIG. 4 is a diagram of an illustrative detail of the computing environment in which one or more embodiments of infrastructure which extends the use of surveillance systems for traffic profiling may be configured for an onsite implementation.

FIG. 4 illustrates an onsite configuration in which 107 is located onsite and does not have access to 109. In this example, 107 has all the capabilities configured as 107 in the split mode configuration of the solution as illustrated in FIG. 3. This configuration is useful to implement extension of surveillance systems solution when licensing permits engines 122 to be onsite, or when access to sufficient bandwidth network such as 106 is not available, or a firewall is in place onsite to access 106, or for security and contract reasons data gathered onsite cannot be made directly available over a network such as 106. In this configuration, data and accounting information may be retrieved by direct onsite access to 107, by CD, memory card or other device. This information may also be accessed on 107 by other means, such as through a locally isolated network on 103 or with restricted, onsite, local access only to a LAN (local area network) 106 as shown by 403.

Figure 5:
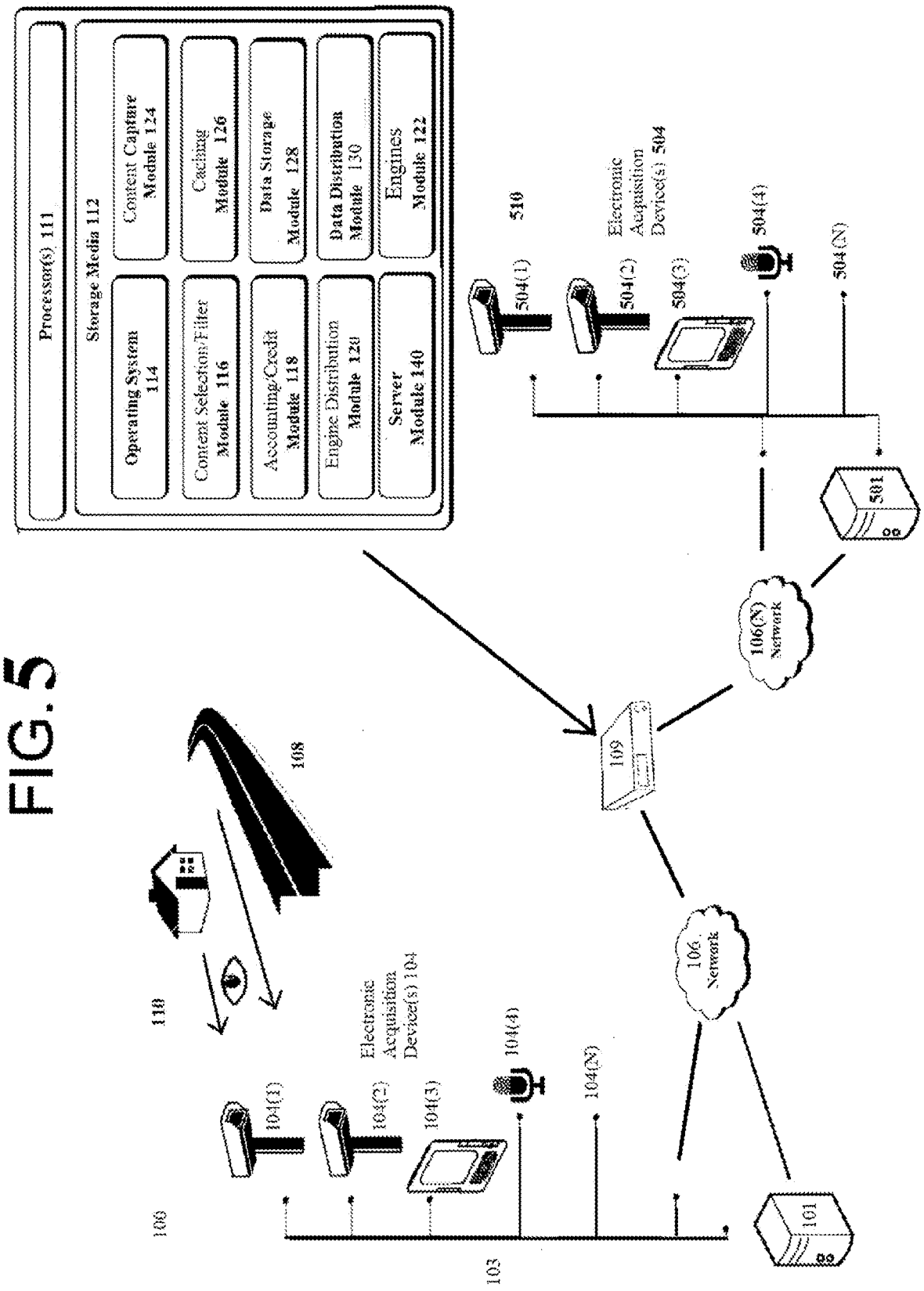
FIG. 5 is a diagram of an illustrative detail of the computing environment in which one or more embodiments of infrastructure which extends the use of surveillance systems for traffic profiling may be configured for an offsite implementation.

FIG. 5 illustrates an offsite configuration in which 107 is not present at the site where acquisition devices 104 reside, or server 101 may be present, but the surveillance system has been configured access to 109 via a network such as 106 or a WAN (wide area network) or the internet. In this example, 109 has all the capabilities of 107 configured as an onsite configuration of the solution as in FIG. 4, but is not located onsite with devices 104 or server 101. In this example, onsite configuration to grant network access is to 109 may easily be accomplished by any individual familiar with networks such as 103 and 106, computer systems, and routing. Off the shelf telecommunications equipment, off the shelf industry standard surveillance systems with a server 101, and even off the shelf network connectable acquisition devices 104 can be configured to have access to 109.

This offsite implementation is useful to implement extension of surveillance systems solution when a server 107 cannot be deployed onsite or when licensing issues do not allow engines 122 to be present in 107 at one or more onsite locations or it is not deemed desirable to have 107 onsite. 109 running as a server with module 140 can service one or more site locations such as 110 and 510, and by means of its internal modules Selection Filter 116, Accounting Credit 118, Engine Distribution 120, Engines 122, Content Capture 124, Caching 126, Data Storage 128, and Data Distribution 130 can convert these systems to multi use and provide content and data that the onsite owners and administrators can monetize.

In the example of FIG. 2, an onsite security surveillance system uses the infrastructure to extend the surveillance system for vehicle traffic profiling. In this example although image content acquired from devices 104(N) may be stored onsite on surveillance system server 101, module 124 also gets a copy of the content from devices 104(N). Camera 104(1) is selected as an input by 116 from which content will be examined for profiling, since it is placed on the edge of the surveillance system with a line of sight vision 204 to a road access way 108. Content acquired by capture module 124 from all other devices 104 other than 104(1) is not examined further. Although the camera 104(1) has access to all pedestrians and traffic to and from the access way in and out of the site for use as a security system, content filter 116 sends it to engines which only identifies automobiles 201 and license plates (LPR) on the roadway. The data distribution module 130 has been configured to not report and profile the site owners vehicle 202 if recognized by the engines, as agreed upon by a privacy agreement. Traffic profiles for 201 and all other vehicles are recorded and tallied by the accounting module 118. This data may be held on 107 by the data distribution module for access onsite at any time. The data distribution module may also make this data available to outside parties, as illustrated by 203, by means of a file system, API, or other means utilizing network 106.

Figure 6:
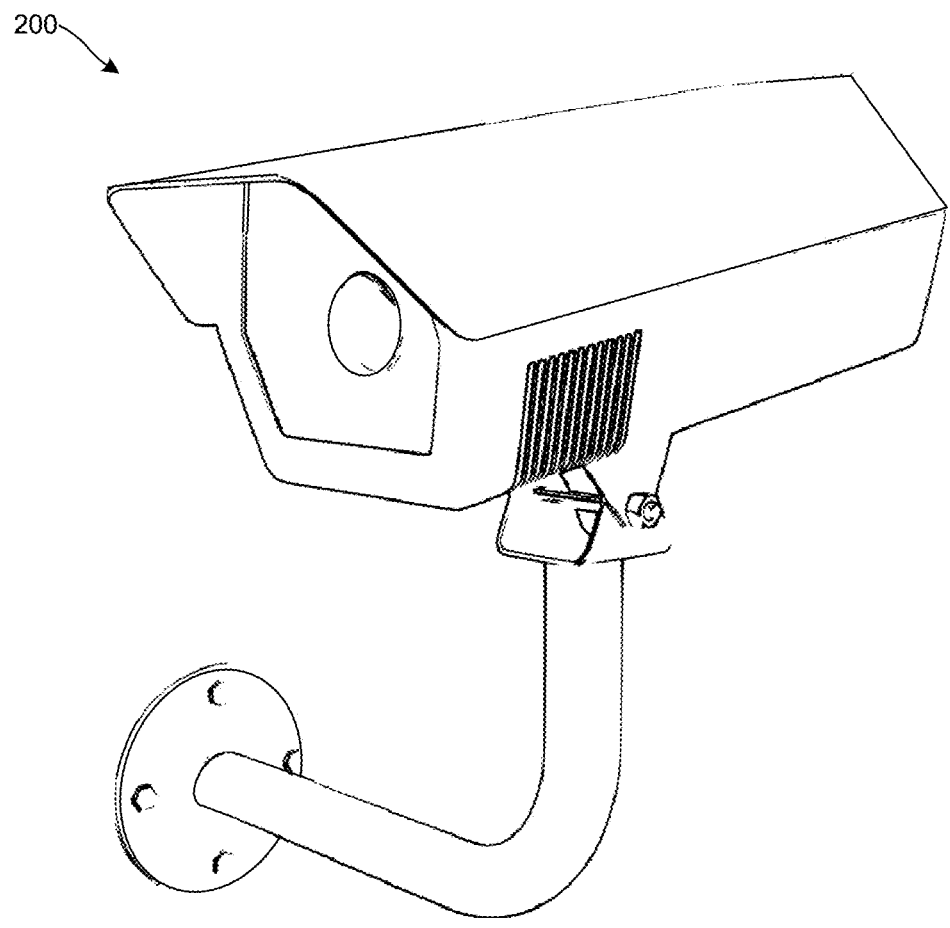
FIG. 6 is an expanded view of an analog video camera system 200.

FIG. 6 is an expanded view of an analog video camera system 200. The analog video camera system 200 is also referred to in the art as a video content acquisition system, a legacy security camera system, and an image and audio content acquisition system.

Figure 7:
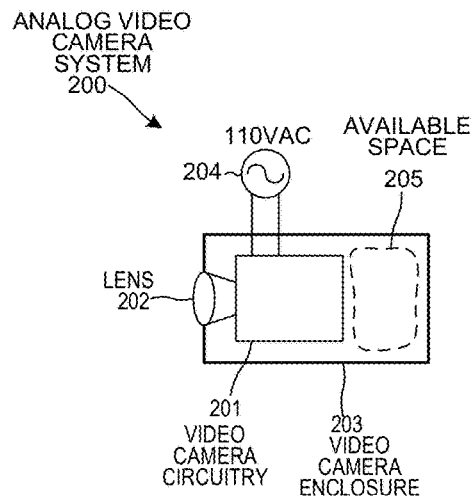
FIG. 7 is a block diagram of the analog video camera system 200 shown in FIG. 6.

FIG. 7 is a block diagram of the analog video camera system 200 shown in FIG. 6. Analog video camera system 200 comprises video camera circuitry 201, a lens 202, and video camera enclosure 203. Video camera circuitry 201 is powered by an AC power supply 204. Reference numeral 205 identifies an area of space available within the enclosure 203.

Figure 8:
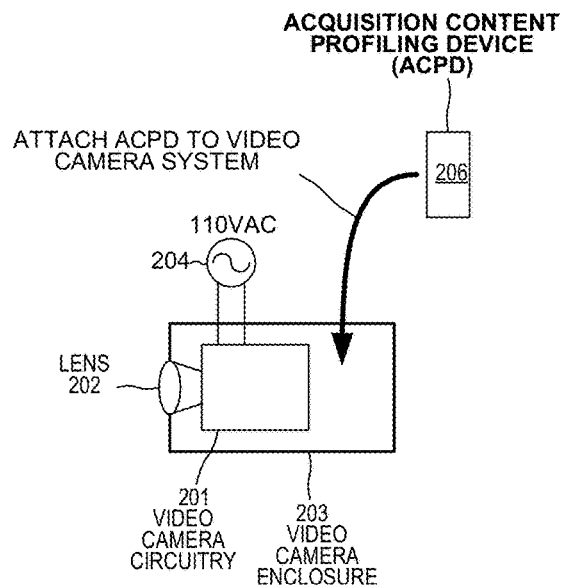
FIG. 8 is a diagram showing how a novel acquisition content profiling device (ACPD) 206 is attachable to the analog video camera system 200.

FIG. 8 is a diagram showing how a novel acquisition content profiling device (ACPD) 206 is attachable to the analog video camera system 200. Available space 205 of the analog video camera system 200 is tight and significantly limited. In one embodiment, ACPD 206 is configured to fit entirely within the enclosure 203 of the analog video camera system 200. ACPD 206 is configured to fit entirely within a volume of less than or equal to 350 cm$^3$.

Figure 9:
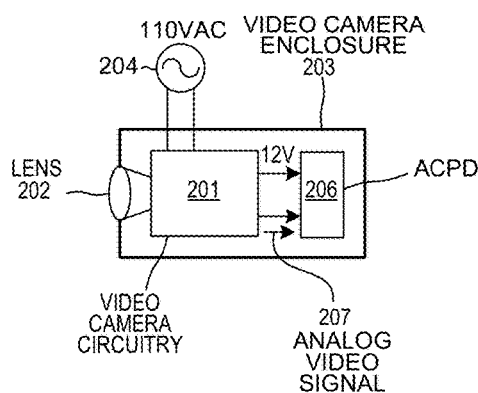
FIG. 9 is a diagram showing how the ACPD 206 is coupled to receive an analog video signal 206 that is output by the video camera circuitry 207.

FIG. 9 is a diagram showing how the ACPD 206 is coupled to receive an analog video signal 206 that is output by the video camera circuitry 207. ACPD 206 is supplied by a 12.0 volt signal output by the video camera circuitry 201. In accordance with one novel aspect, ACPD 206 does not require an external power source or battery. ACPD 206 is configured to be supplied entirely by the analog video camera system 200.

Figure 10:
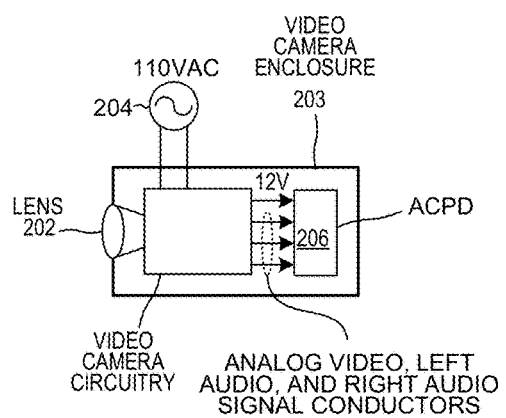
FIG. 10 is a diagram showing how the ACPD 206 is coupled to receive audio signals output by the video camera circuitry 207.

FIG. 10 is a diagram showing how the ACPD 206 is coupled to receive audio signals output by the video camera circuitry 207. In one embodiment, the ACPD 206 is only coupled to receive and process audio signals output by the video camera circuitry 207. In another embodiment, the ACPD 206 is only coupled to receive and process video signals output by the video camera circuitry 207. In yet another embodiment, the ACPD 206 is coupled to receive and process video signals and audio signals output by the video camera circuitry 207.

Figure 11:
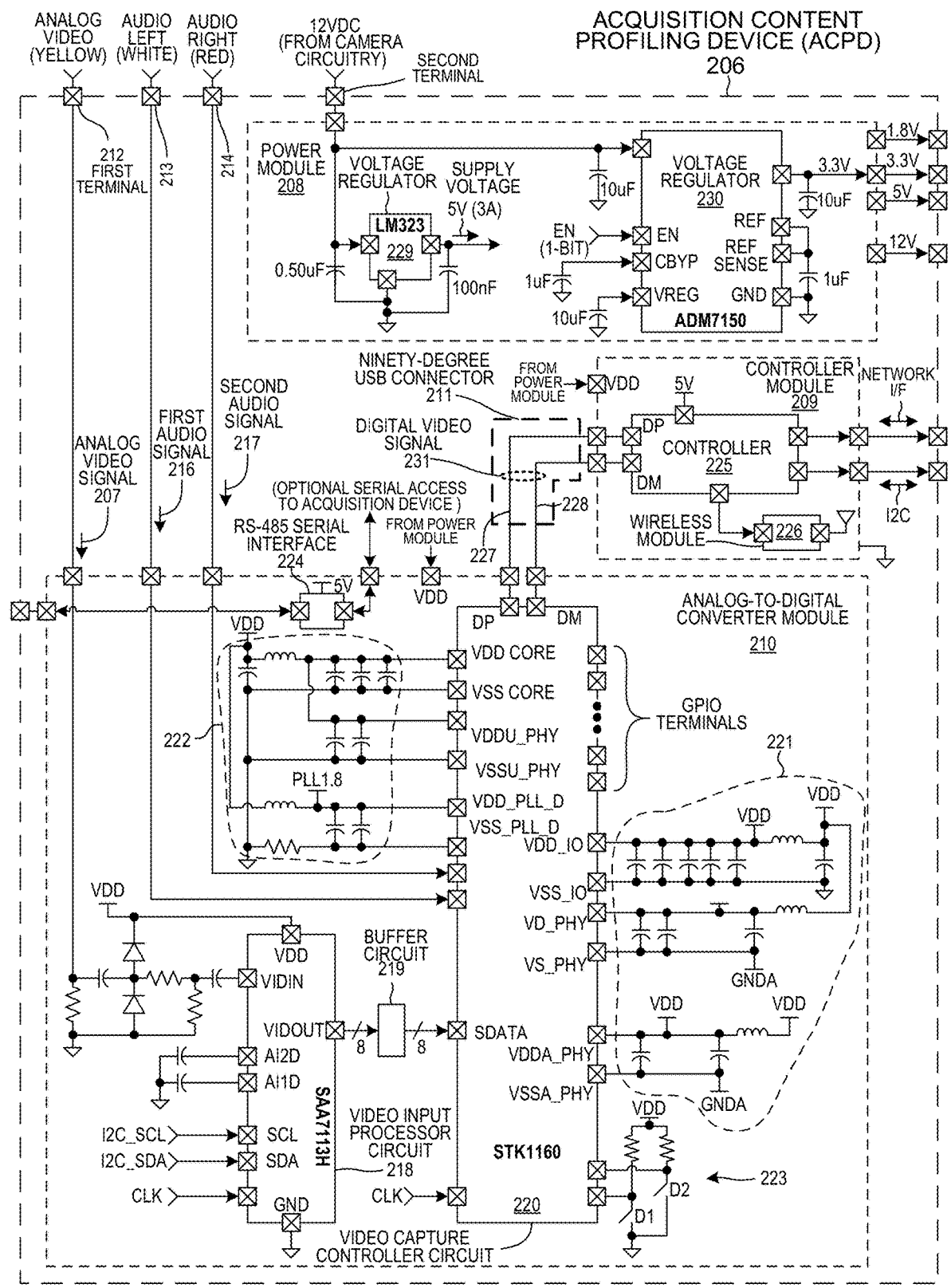
FIG. 11 is a detailed circuit diagram of the ACPD 206.

FIG. 11 is a detailed circuit diagram of the ACPD 206. ACPD 206 comprises and showing how the ACPD 206 attaches to the analog video camera system 200. ACPD 206 comprises a power module 208, a controller module 209, an analog to digital converter (ADC) module 210, a ninety-degree USB connector 211, a first terminal 212, a first audio signal terminal 213, a second audio signal terminal 214, and a support attachment 215 (shown in FIG. 12). ACPD 206 is adapted to receive the analog video signal 207 output by the analog video camera system 200 via the first terminal 212. ACPD 206 is adapted to receive a first audio signal 216 output by the analog video camera system 200 via the second terminal 213. ACPD 206 is adapted to receive a second audio signal 217 output by the analog video camera system 200 via the third terminal 214. In other embodiments, ACPD 206 receives only audio signals or only video signals from the analog video camera system 200.

ADC module 210 comprises a video input processor circuit 218, a buffer circuit 219, a video capture controller circuit 220, power circuitry 221 and 222, input switch circuit 223, and a serial interface circuit 224. ADC module 210 is supplied from power module 208 and receives supply voltage VDD. Power circuitry 221 and 222 supplies the video capture controller circuit 220. In this example, video input processor circuit 218 is a 9-bit video input processor available from Phillips Semiconductor having part number SAA7113H, and video capture controller circuit 220 is a USB2.0 TV Tuner/Video Capture Controller available from Syntek Semiconductor Co., Ltd. having part number STK1160.

Controller module 209 comprises a controller 225 and a wireless module 226. Controller module 209 is supplied from power module 208 and receives supply voltage VDD. Controller 225 is realized as an application specific integrated circuit (ASIC), a graphics processing unit (GPU), an integrated circuit having an amount of combinational logic circuitry, an integrated circuit having an amount of sequential logic circuitry, an integrated circuit having an amount of sequential logic circuitry and an amount of combinational logic circuitry, or other dedicated hardware. In the example of FIG. 11, the controller 225 is a Raspberry Pi Compute Module available from Raspberry Pi (Trading) Ltd. The processing functions of controller 225, including motion detection, feature detection, image segmentation, and marking functionality are performed within the controller 225. Performing these functions on the controller 225 using dedicated hardware achieves faster performance than performing the processing on an external general purpose computing system. In one example, the controller 225 performs the above functions entirely within ACPD 206 without communicating information externally for further processing. In another example, the controller 225 performs some of the above functions within ACPD 206 and others of the above functions are performed externally by communicating information to an external processor.

The ninety-degree USB connector 211 comprises a DP conductor 227 and a DM conductor 228. The ninety-degree USB connector 211 is adapted to conduct digital audio or video information from the ADC module 210 to the controller module 209. The ninety-degree USB connector 211 substantially reduces the volume of the ACPD 206 allowing ACPD 206 to fit compactly within the available space 205 of the analog video camera system 200.

Power module 208 comprises a first voltage regulator 229 and a second voltage regulator 230. Power module 208 is coupled to receive a 12.0 volt supply voltage from the camera circuitry 201. Power module 208 generates supply voltages from the received 12.0 volt supply voltage. The generated supply voltages are used to power the controller module 209, the ADC module 210, and other components that are external to the ACPD 206. Power module 208 outputs a plurality of supply voltages from the camera circuitry 201 supply voltage. In this example, power module 208 generates a 1.8 volt signal, a 3.3 volt signal, a 5.0 volt signal, and a 12.0 volt signal. These supply voltages are also accessible to ancillary components outside of ACPD 206. In one embodiment, the first voltage regulator 229 is a 3-ampere, 5 volt positive voltage regulator available from ON Semiconductor Components Industries, LLC having part number LM323. The second voltage regulator 230 is a 800 mA Ultralow Noise, High PSRR, RF Linear Regulator available from Analog Devices, Inc. having part number ADM7150.

Additional power modules in addition to power module 208 may be coupled to receive the 12.0 volt supply voltage to generate and supply different voltages to different auxiliary components. One or more power modules similar to power module 208 are coupleable to the 12.0 volt supply voltage from camera circuitry 201. Only two voltage regulators are shown in FIG. 11 for explanatory purposes, but a person of ordinary skill in the art will recognize that additional voltage regulators will be incorporated into the power module 208 to provide desired voltages for other components within the ACPD 206 and external to the ACPD 206.

During operation, the ADC module 210 receives the analog video signal (and optionally the first and second audio signal 216 and 217) and converts the received signal into a digital signal 231. The digit signal 231 is communicated to the control module 209 via the nine-degree USB connector 211. The control module 209 processes the digital signal 231 thereby detecting motion and features from the digital signal 231. If a feature is detected, then the control module 209 wirelessly communicates at least a portion of digital information converted by the ADC module 210 using the wireless module 226.

Figure 12:
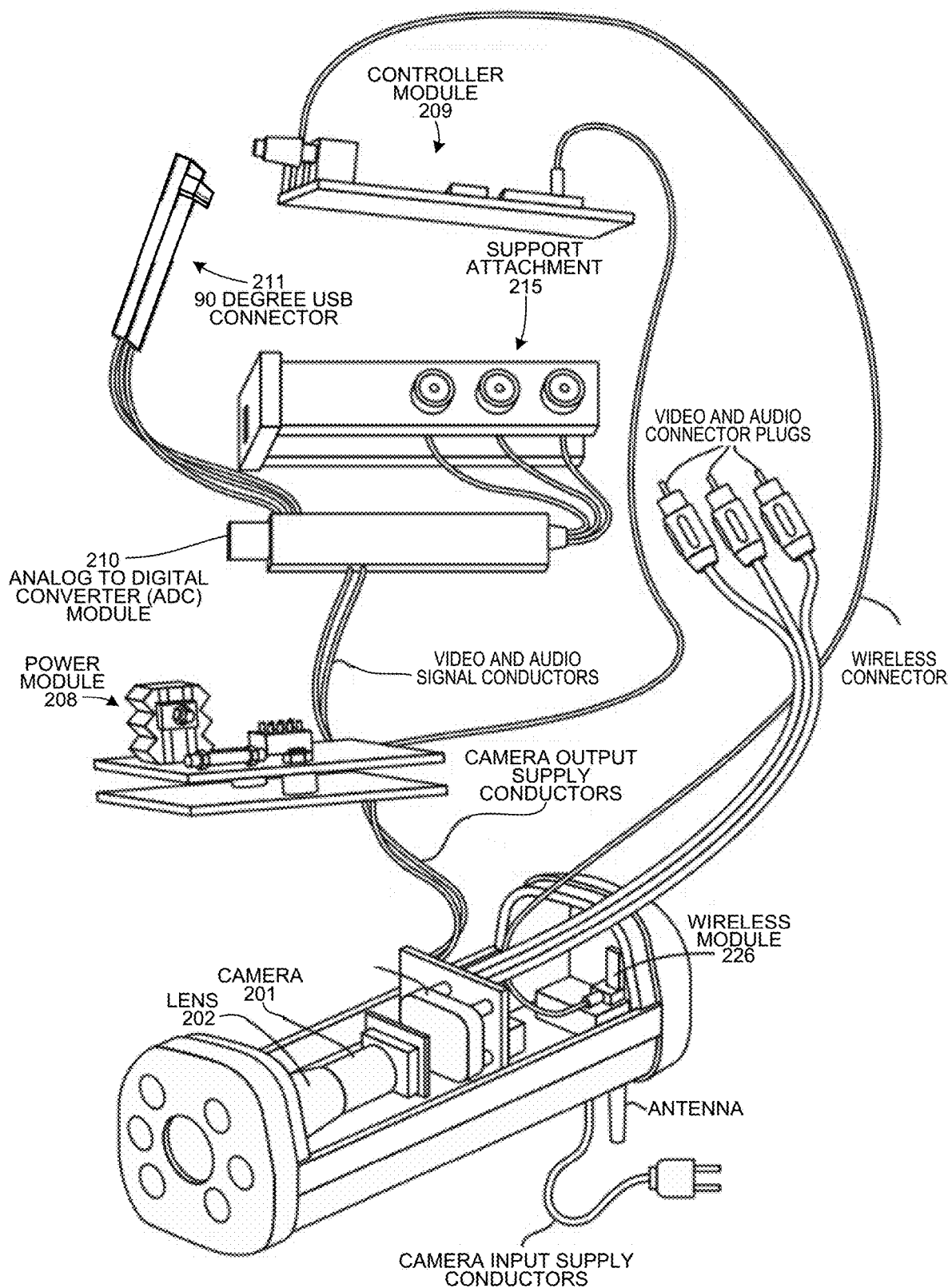
FIG. 12 is a detailed diagram of a perspective view showing various components of the ACPD 206.

FIG. 12 is a detailed diagram of a perspective view showing various components of the ACPD 206 and showing how the ACPD 206 attaches to the analog video camera system 200.

Figure 13:
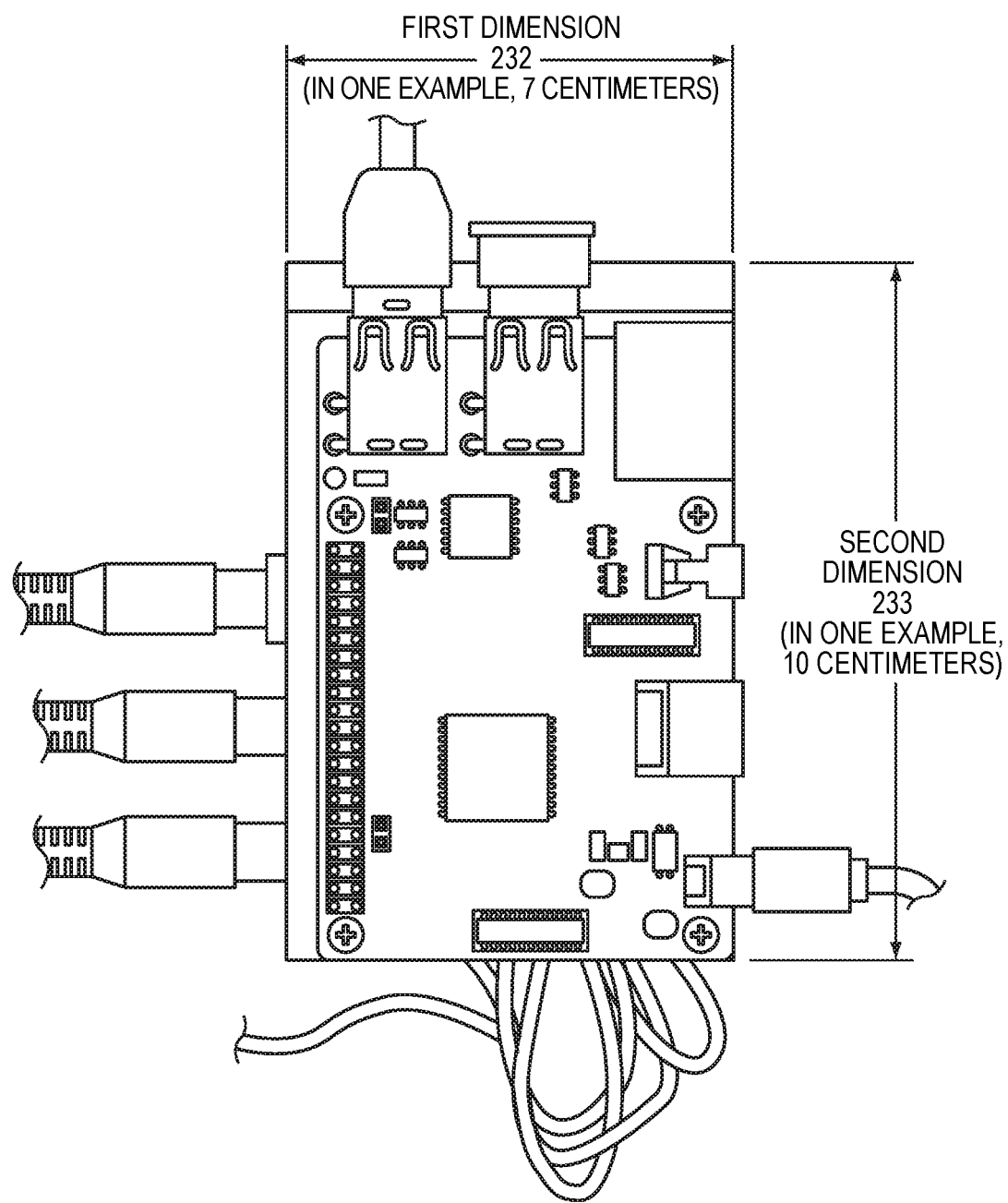
FIG. 13 is a diagram of a top-down view of the ACPD 206.

FIG. 13 is a diagram of a top-down view of the ACPD 206. The ACPD 206 has a rectangular shape. The ACPD 206 extends along a first dimension 232. The first dimension 232 is less than or equal to 7.0 centimeters. The ACPD 206 extends along a second dimension 233. These dimensions permit the ACPD 206 to fit into video camera enclosures, such as video camera enclosure 203. Larger dimensions would prevent the ACPD 206 from being insertable into conventional camera systems. The second dimension 233 is less than or equal to 10.0 centimeters. In this example, the first dimension 232 is 7.0 centimeters and the second dimension 233 is 10.0 centimeters.

Figure 14:
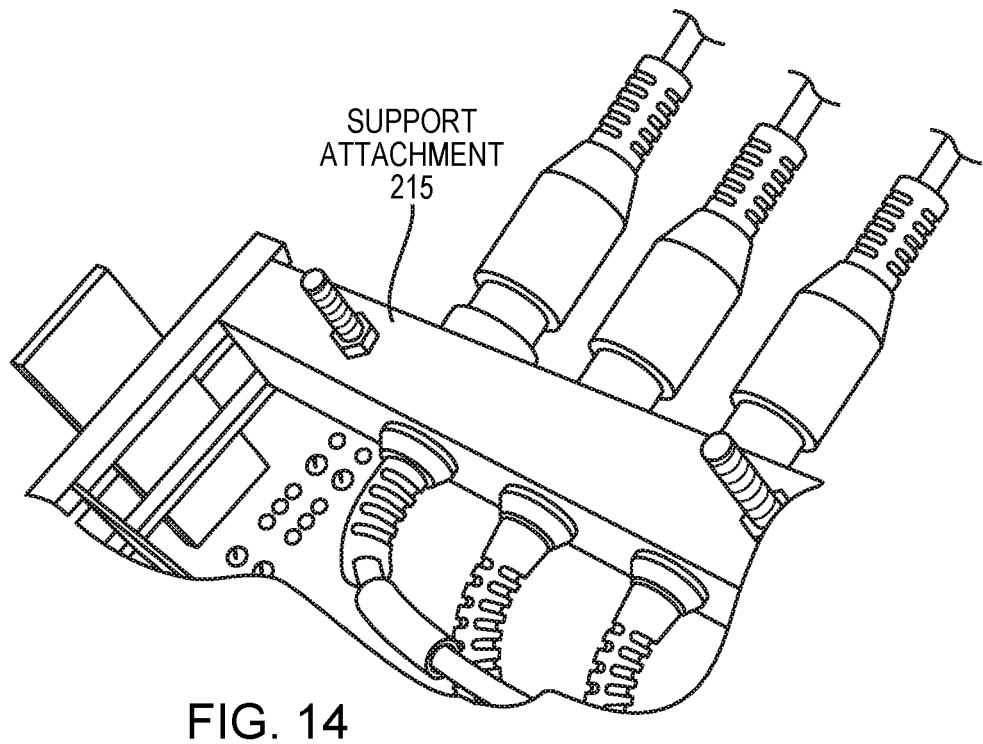
FIG. 14 is a diagram of a perspective view of the ACPD 206.

FIG. 14 is a diagram of a perspective view of the ACPD 206.

Figure 15:
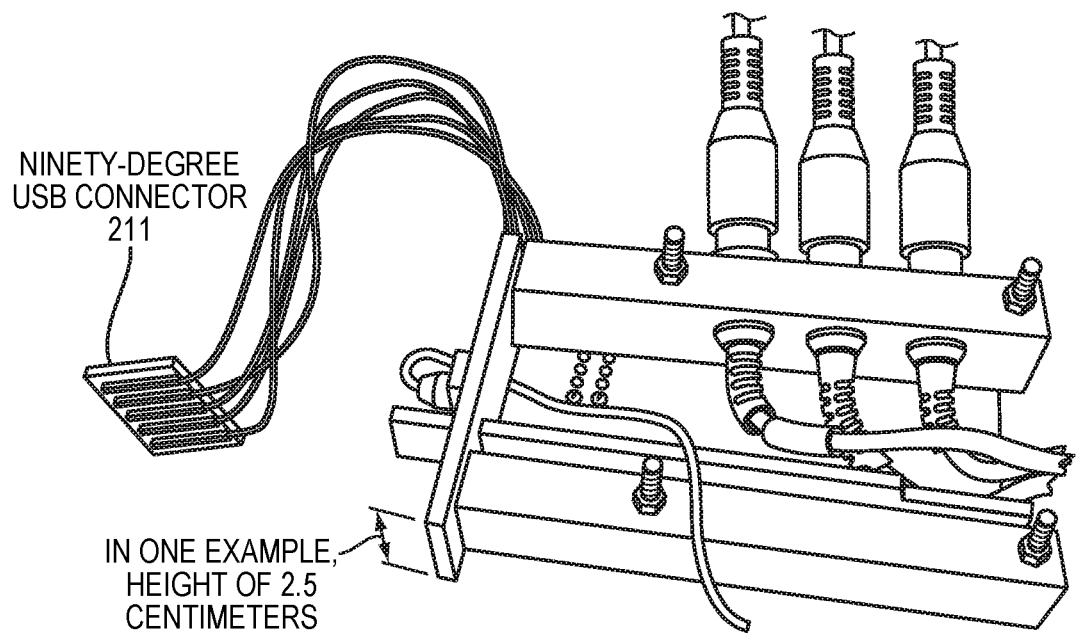
FIG. 15 is a diagram of another perspective view of the ACPD 206.

FIG. 15 is a diagram of another perspective view of the ACPD 206.

Figure 16:
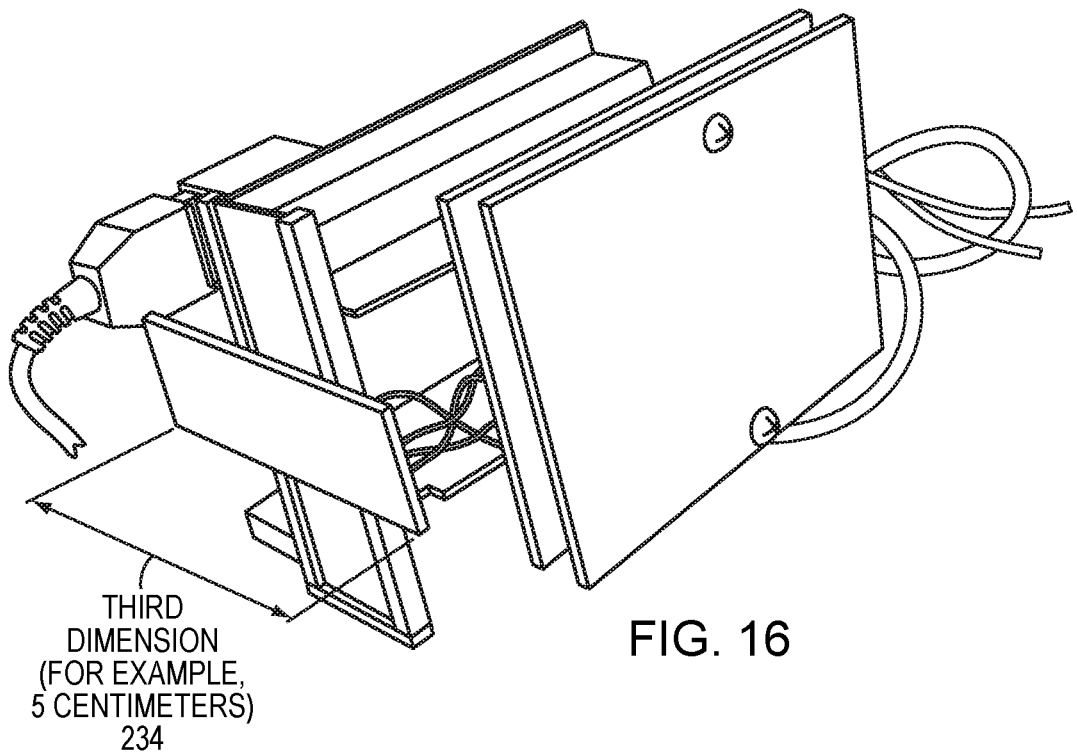
FIG. 16 is a diagram of yet another perspective view of the ACPD 206.

FIG. 16 is a diagram of yet another perspective view of the ACPD 206. The ACPD 206 extends along a third dimension 234. The third dimension 234 is less than or equal to 5.0 centimeters. The third dimension 234 is less than or equal to half of the second dimension 233. In this example, the third dimension 234 is 5.0 centimeters.

Figure 17:
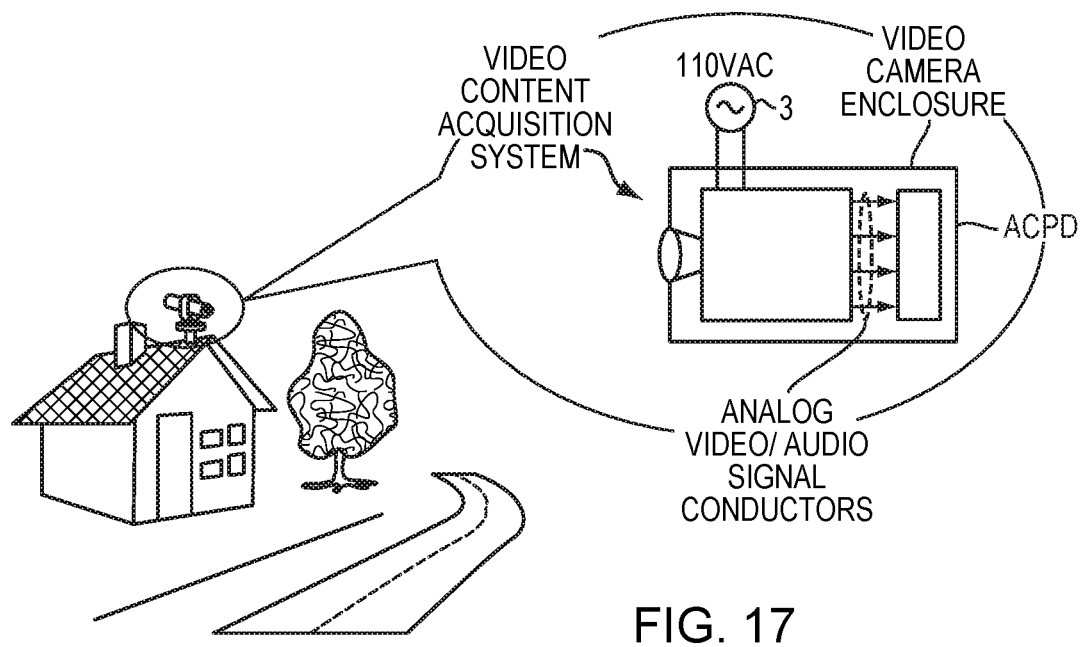
FIG. 17 is a diagram showing how a video content acquisition system is retrofitted with the ACPD 206.

FIG. 17 is a diagram showing how a video content acquisition system is retrofitted with the ACPD 206.

Figure 18:
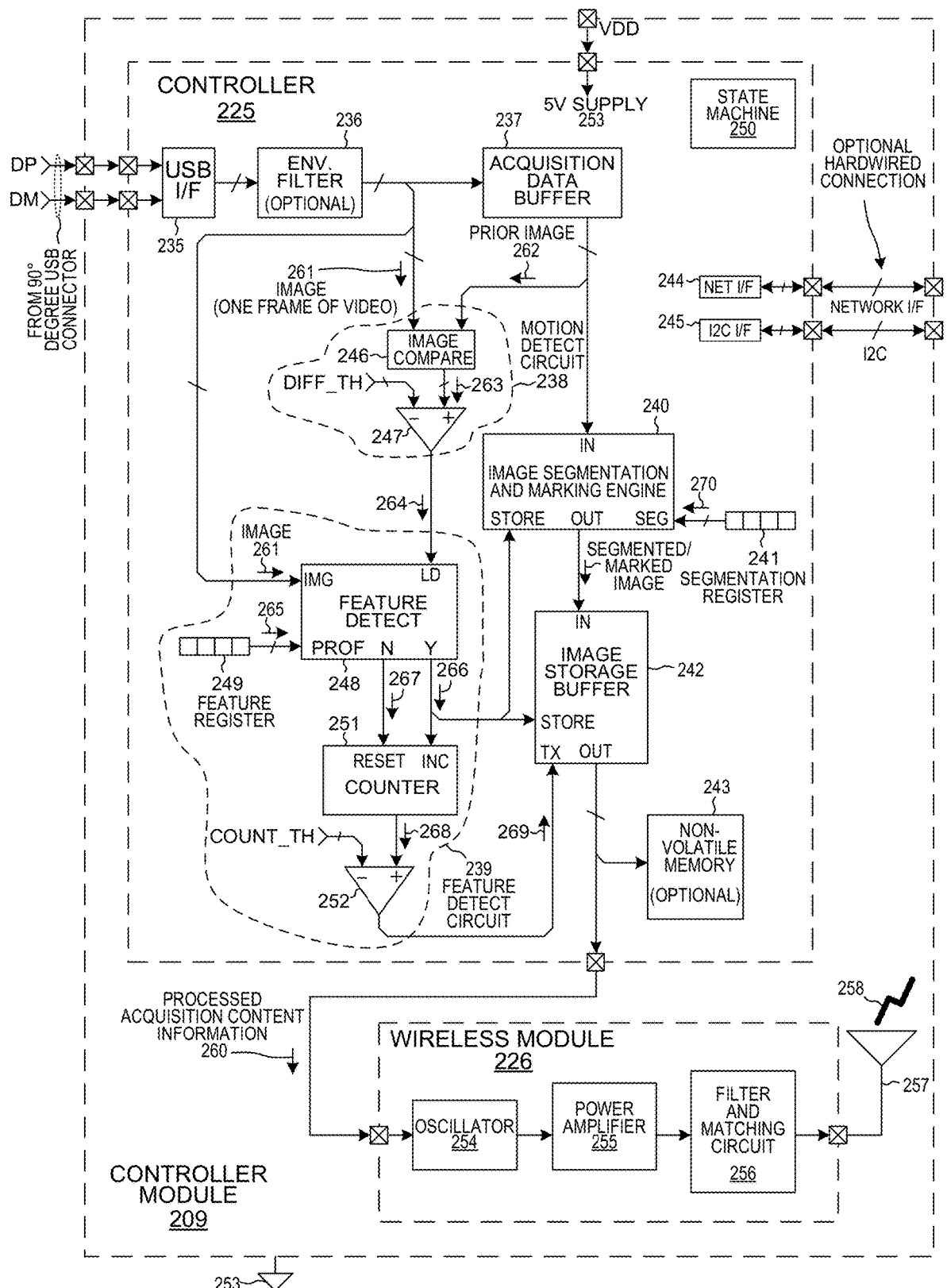
FIG. 18 is a more detailed diagram of the controller module 209.

FIG. 18 is a more detailed diagram of the controller module 209. The controller module 209 comprises the controller 225 that performs environment image correction, motion detection that identifies movement such as passing vehicles, feature detection such as license plate recognition, image segmentation that masks portions of the acquired content from being accessible by third parties, and marking functionality that associates the acquired content to an entity such as an entity that owns the camera.

The controller 225 comprises a USB interface 235, an environmental filter circuit 236, an acquisition data buffer 237, a motion detector circuit 238, a feature detect circuit 239, an image segmentation and marking engine 240, segmentation register 241, an image storage buffer 242, a memory structure 243, network interface circuitry 244, I2C interface circuitry 245, and a state machine 250. The state machine 250 connections between other circuit blocks is omitted to simplify explanation. Power supply connections to circuitry of the controller 225 are also omitted from FIG. 18 to simplify explanation. The controller 225 receives a 5.0V supply from the power module 208 and is coupled to a ground node 253. The 5.0V supply is used to power circuitry of the controller 225. The motion detect circuit 238 comprises an image comparator circuit 246 and a comparator circuit 247. The feature detect circuit 239 comprises a feature detect block 248, a feature register 249 that stores a feature profile, a counter 251, and a comparator 252.

The controller 225 processes the acquisition content information received from the ADC module via the USB connector 211 and generates processed acquisition content information 260. Processing of the acquisition content information involves detecting motion in the image information, detecting features in the image information, performing image segmentation on the image information to prevent third-party access to certain portions of the image information, and marking the image information to associate the image information with the entity that owns the acquisition content information. After the controller 225 processes the acquisition content information and generates the processed acquisition content information 260, controller 225 stores the processed acquisition content information in memory 243 and/or communicates the processed acquisition content information outside of the controller 225 to an external device. Wireless transmission of the processed acquisition content information 260 is provided by the wireless module 226. The wireless module 226 comprises an oscillator 254, a power amplifier 255, a filter and matching circuit 256, and an antenna 257. Antenna 257 communicates a wireless signal 258. An external receiver receives the wireless signal 258 comprising the processed acquisition content information 260. The wireless module 226 receives the processed acquisition content information from the controller 225. Wired transmission is provided via network interface circuit 244 and/or I2C interface circuitry 245.

The environment filter circuit 236 compensates for changes in outside environmental conditions. The environment filter circuit 236 involves a second camera (not shown) that is rotated between 30° and 60° from camera 200. The second camera compensates for undesirable weather conditions that may otherwise prevent camera 200 from accurately capturing image information. For example, during the late winter season and early spring season in New England, on a clear day the sun is extremely intense as it sets in the west. If the camera system 200 is facing west, east looking at the rear of vehicles that are eastbound, then camera system 200 will experience tremendous glare and even the reflection of the sun on the metal, rear windows, and license plate itself. Saturation detection and anti-glare techniques can be applied to portions of the image, but only heuristically without knowing lighting information or shape. However, this is not sufficient because with only one camera the size and shape of the car being detected is not known. The second camera is provided to obtain lighting information and sunlight angle information. The sunlight angle information is determined by querying a database for time of year and time of day. Light intensity information cannot be determined by lookup and is determined in part by using the second camera.

Lighting information is obtained by obtaining a basis background image without vehicles or other moving objects present before the camera. When an object or motion is detected in a grid, the light intensity and angle of the outdoor environment is applied to the detected image thereby yielding more accurate processing of the image. The light intensity and sunlight angle information is determined by the position of the second environmental camera relative to the profiling camera system 200. For example. If the second environmental camera is perpendicular to the ground and detects sunlight at 10,000 lux at an angle of 30° degrees above the horizon, and the profiling camera system 200 is aimed 30° degrees down to the road, then the angle of the sunlight on the target in the profile image is determined to be 60 degrees. Lux is estimated by a camera by looking at the pixel intensity and brightness of known shape and objects. In this example, the second environmental camera is detecting a stationary image rather than an unknown object. By using the stationary image as a basis, the second environmental camera provides light intensity and sunlight angle information.

In another embodiment, the profiling camera system 200 obtains the base image when no movement is detected. An object in the stationary image is detected and processed throughout the day periodically to calculate the lux and angle of the daylight at various times. One time calibration can be done with an environmental camera if the sunlight angles are known.

The motion detect circuit 238 compares an image, or a frame of captured video, to a prior image stored in the acquisition data buffer 237. The motion detect circuit 238 receives a multi-bit digital signal 261 that stores information of one frame of video captured by camera system 200 onto a first terminal of the image compare circuit 246 and a multi-bit digital signal 262 that stores information of one prior frame of video captured by camera system 200 onto a second terminal of the image compare circuit 246. The image compare circuit 246 performs an image comparison and generates a multi-bit digital signal 263 indicative of the difference between the image 261 and the prior image 262. The comparator 247 receives a predetermined threshold value DIFF_TH onto a inverting input terminal and the signal 263 onto the non-inverting input and outputs one-bit digital signal 264. The threshold value DIFF_TH indicates the sensitivity of the motion detect circuit 238. The greater the threshold value DIFF_TH, the less sensitive the motion detect circuit 238 is to motion of objects detected by the camera system 200. If the difference between the image 261 and the prior image 262 is not greater than the predetermined threshold value DIFF_TH, then the comparator 247 outputs a digital logic low value indicating that no motion has been detected in the video information captured by the camera system 200. If, on the other hand, the difference between the image 261 and the prior image 262 is greater than the predetermined threshold value DIFF_TH, then the comparator 247 outputs a digital logic high value indicating that motion detect circuit 238 has detected motion in the video information captured by the camera system 200.

The feature detect circuit 239 receives the signal 264 output by comparator 247 and the multi-bit digital signal 261 that stores information of the frame of video captured by camera system 200. The signal 264 is received onto the LD terminal of the feature detect circuit 248. The signal 261 that stores image information captured by the camera system 200 is received onto the IMG terminal of the feature detect circuit 248. The feature detect circuit 248 receives a feature profile 265 onto the PROF terminal of the feature detect circuit 248. The feature detect circuit 248 determines whether a feature is detected in the image information stored in the signal 261 using the feature profile 265. If the feature detect circuit 248 determines that a feature is detected in the image information stored in the signal 261, then a one-bit digital logic signal 266 output by the Y terminal is asserted to a digital logic high level. If, on the other hand, the feature detect circuit 248 determines that a feature is not detected in the image information stored in the signal 261, then a one-bit digital logic signal 267 output by the N terminal is asserted to a digital logic high level.

The counter 251 receives the one-bit digital logic signal 266 output by the Y terminal. If the Y terminal is asserted to a digital logic high level due to the feature detect circuit 248 detecting a feature, then the counter 251 is incremented. A counter output 268 is supplied to non-inverting input of comparator 252. A multi-bit digital value COUNT_TH is supplied onto an inverting input of comparator 252. Once the counter output 268 exceeds the COUNT_TH value, then a one-bit digital signal 269 is asserted to a digital logic high value. The one-bit digital signal 269 is supplied to the image storage buffer 242. When signal 269 is asserted to a digital logic high value, the image storage buffer 242 outputs the processed acquisition content information 260 onto the OUT terminal of the image storage buffer 242.

The image segmentation and marking engine 240 receives the multi-bit digital signal 262 that stores information of the prior frame of video captured by camera system 200 onto the IN terminal, the single-bit digital signal 266 indicating that a feature has been detected onto the STORE terminal, and a segmentation profile 270 onto the SEG terminal. An example of the segmentation profile 270 stored in segmentation register 241 is shown in FIGS. 27-30. In accordance with one novel aspect, the image segmentation and marking engine 240 segments frames of video (or images) captured by the camera system 200 according to the segmentation profile 270. The segmentation profile 270 indicates portions of images captured by the camera system 200 that are to remain un-accessible by third parties and other portions of images captured by the camera system 200 that are accessible to others. For example, portions of the images captured by the camera system 200 may include non-public access areas, such as front lawns or home entrances, that an owner desires to maintain confidential. Such areas are not typically of interest to other entities and are of no monetary value. Some view providing images or video recordings of these private areas as an unnecessary infringement of privacy. However, portions of these images may include public access areas that do have information that may be of value to other entities. For example, a portion of the content captured by camera system 200 may include a portion of a public road in front of a home. Such acquired content may be of interest to other entities. The image segmentation and marking engine 240 causes a portion of the images captured by the camera system 200 to remain masked and inaccessible and another portion of the images captured by the camera system 200 to be accessible to other entities.

In accordance with another novel aspect, the image segmentation and marking engine 240 marks the segmented images with a unique identifier that associates the portion of acquired content that is distributable to other entities with an entity having ownership rights associated with the acquired content. The entity that is associated with the acquired content is typically the owner of the camera system 200. The image segmentation and marking engine 240 marks the segmented images in part to ensure that the entity that is associated with the acquired content is appropriately compensated for making the accessible portions of the video captured by camera system 200 accessible to other entities.

Figure 19:
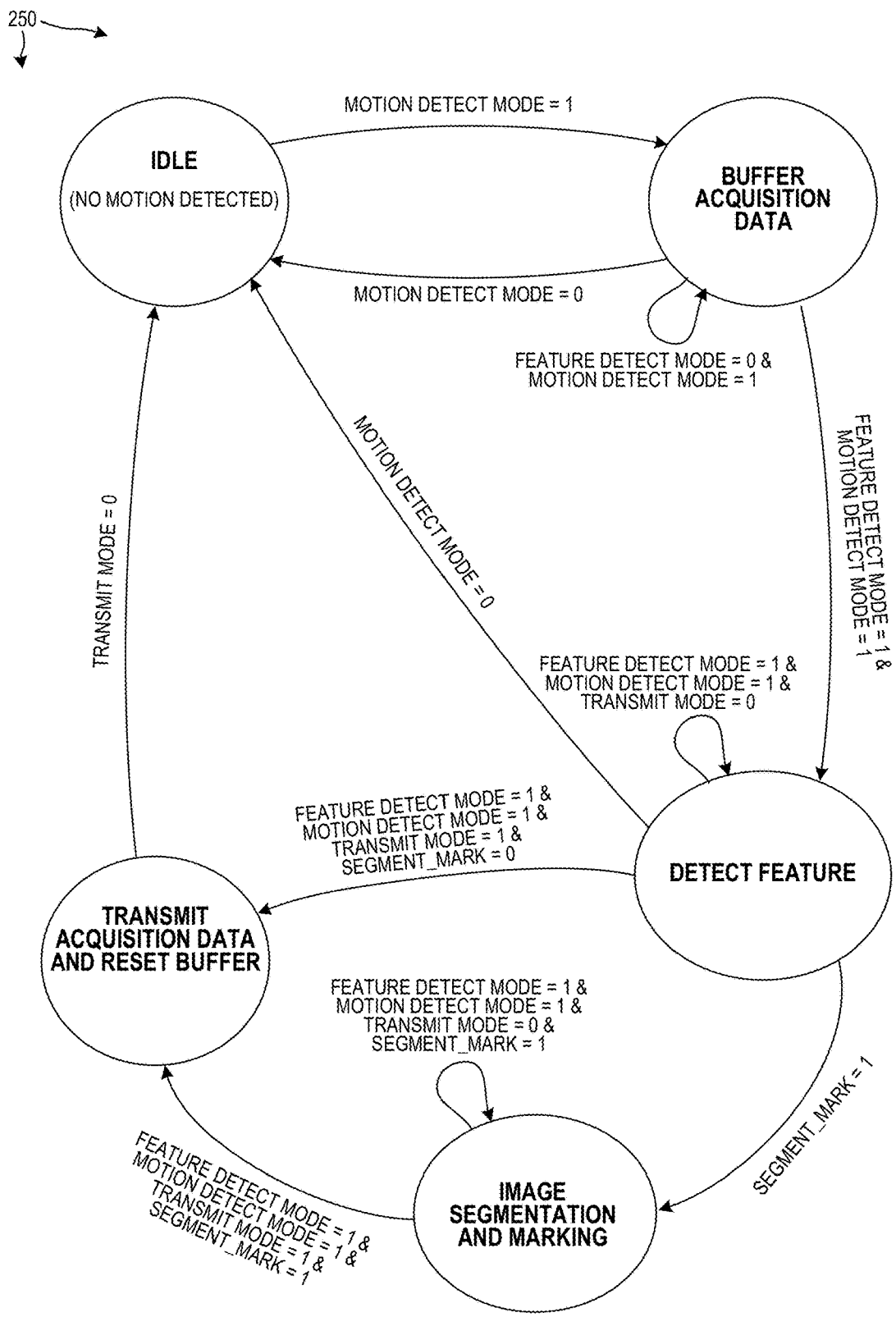
FIG. 19 is a state machine 250 of the controller module 209.

FIG. 19 is a state machine 250 of the controller 250.

Figure 20:
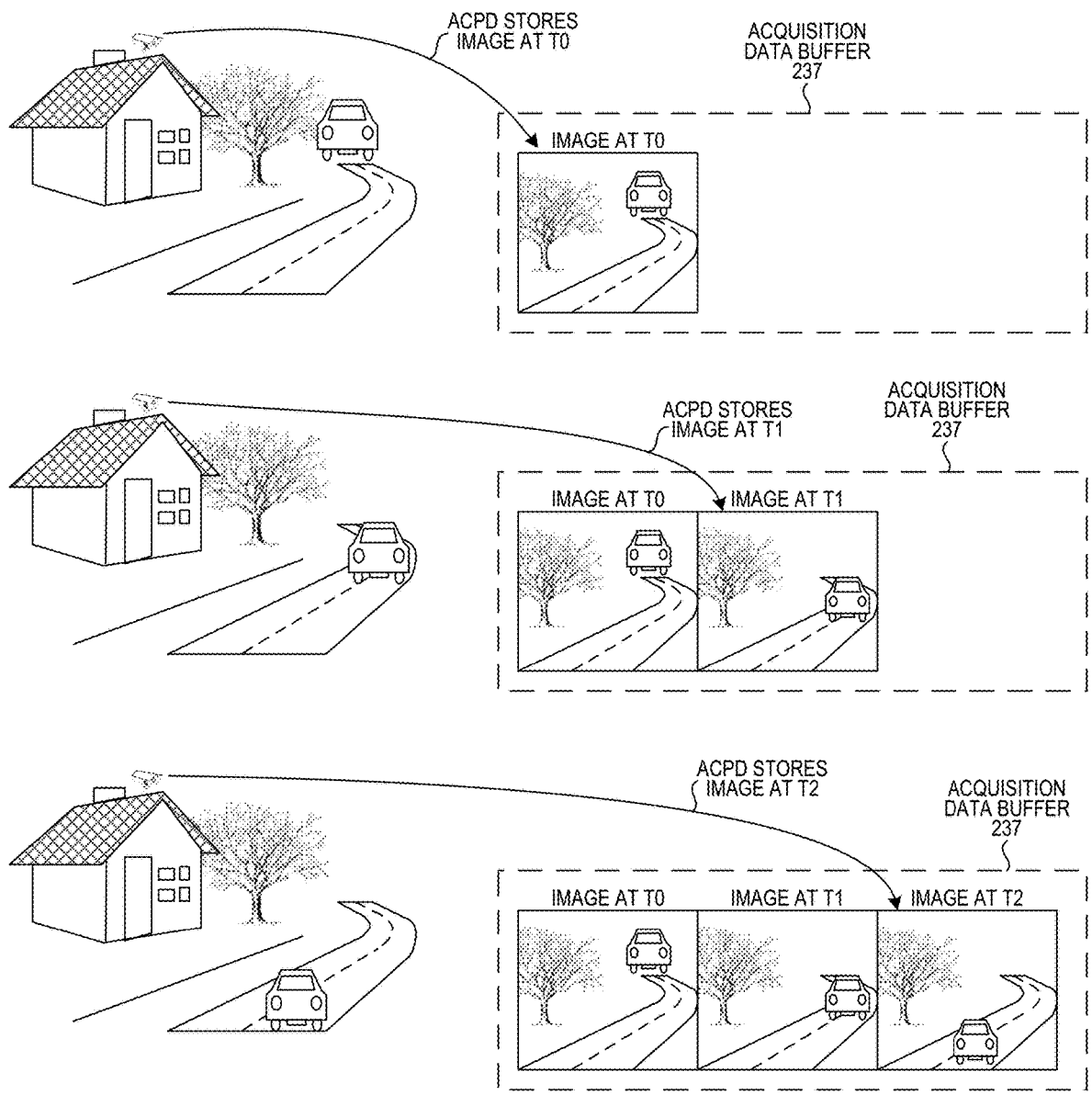
FIG. 20 is a perspective diagram showing how the ACPD 206 detects motion.

FIG. 20 is a perspective diagram showing how the ACPD 206 detects motion. Images T0, T1, and T2 show an example of images captured by the camera system 200 when a moving vehicle drives by camera system 200. Images T0, T1, and T2 are stored in the acquisition data buffer 237. The image T0 shows the image of a vehicle along a public access area and a tree on a lawn of a home. The image T1 shows an image of the vehicle moving further along the public access area and the tree on the lawn of the home. The image T2 shows an image of the vehicle moving even further along the public access area and the tree on the lawn of the home.

Figure 21:
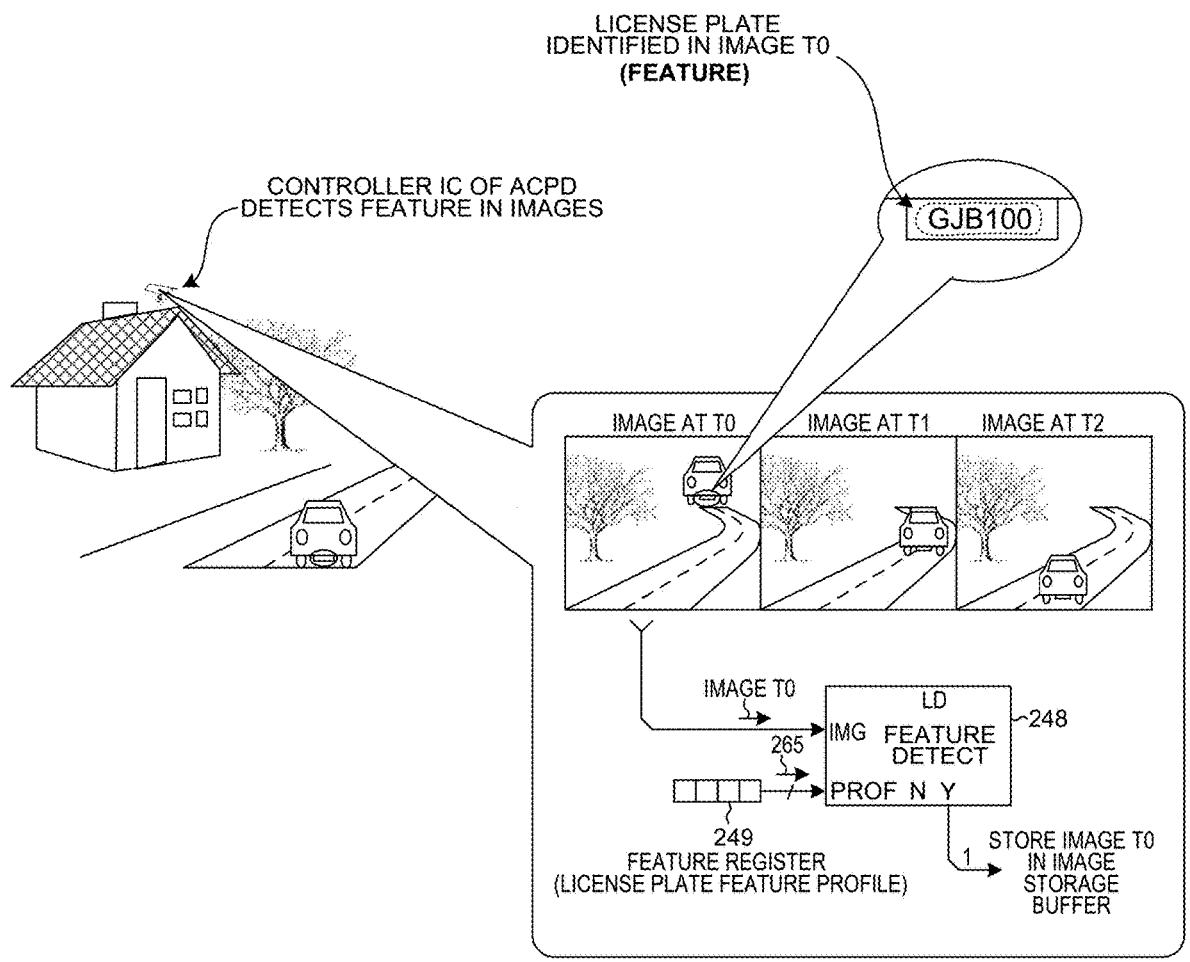
FIG. 21 is perspective diagram that shows how the ACPD 206 detects features in image T0.
Figure 22:
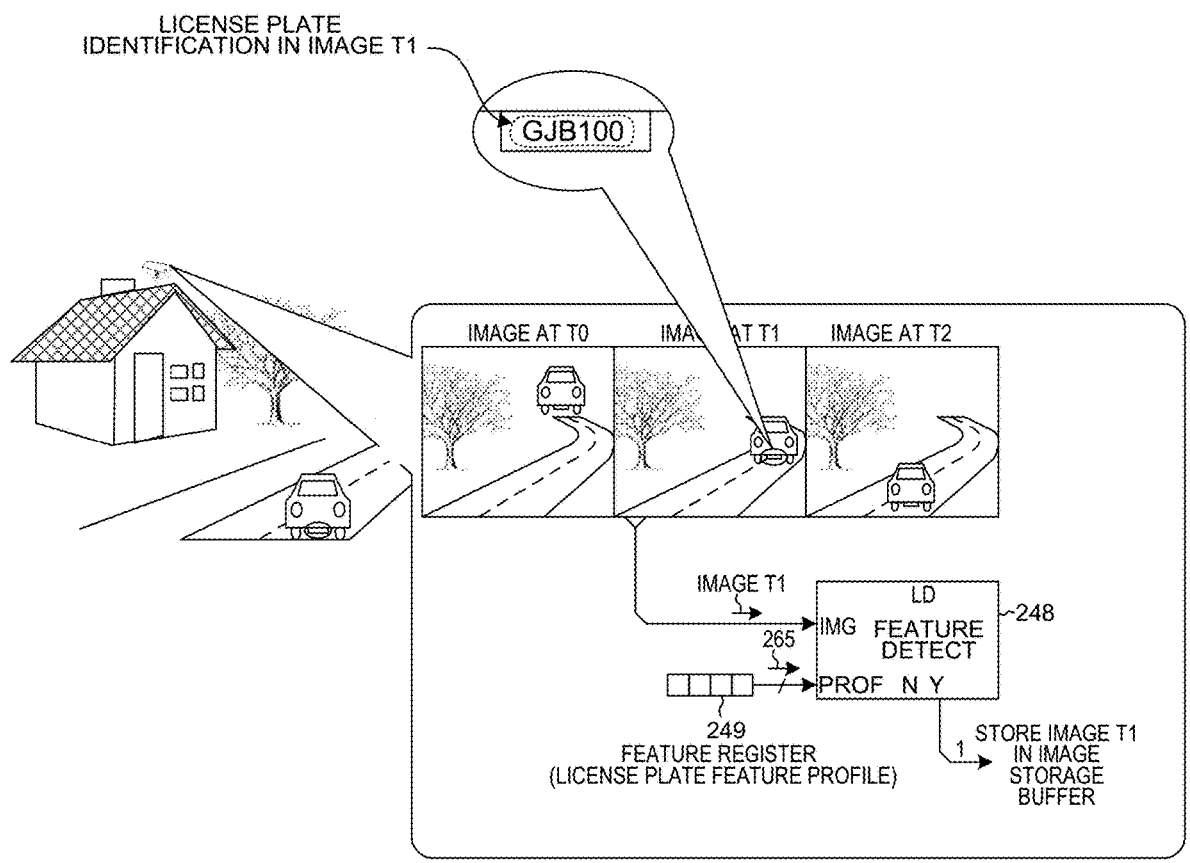
FIG. 22 is perspective diagram that shows how the ACPD 206 detects features in image T1.
Figure 23:
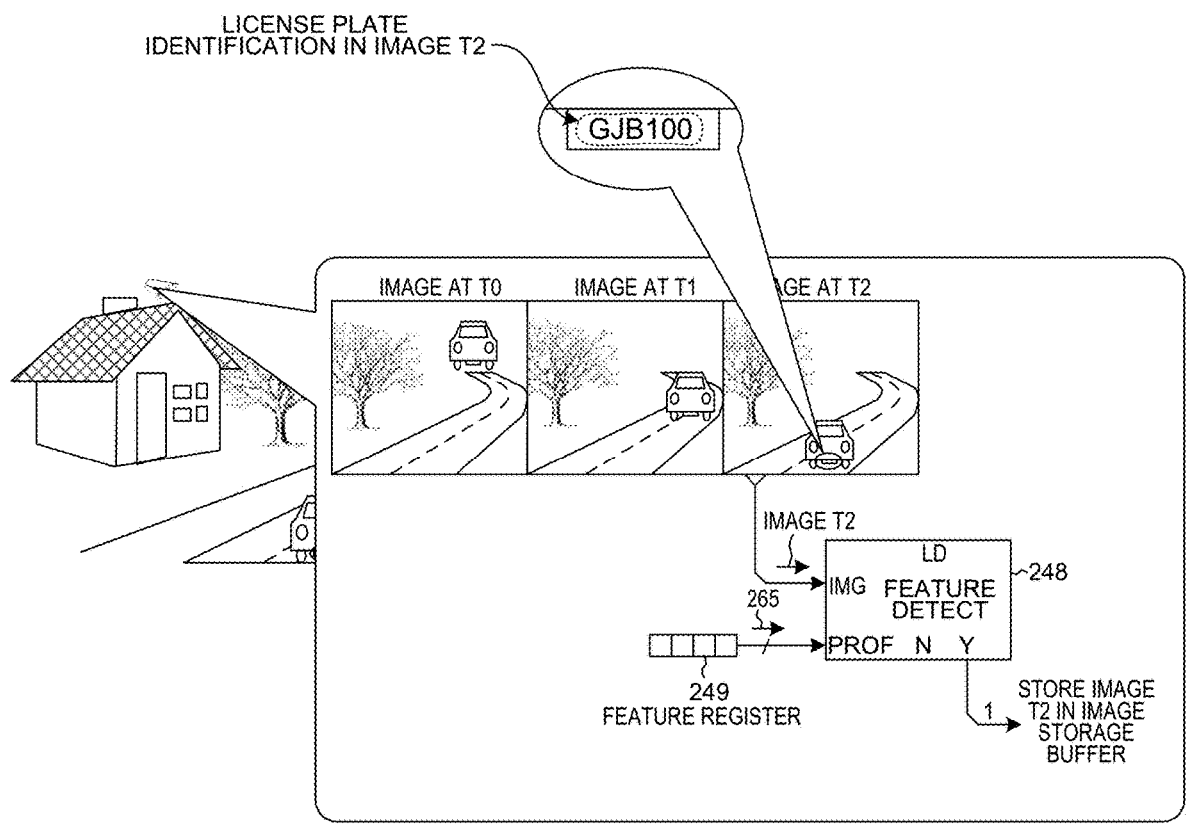
FIG. 23 is perspective diagram that shows how the ACPD 206 detects features in image T2.

FIGS. 21-23 are perspective diagrams that show how the ACPD 206 detects features. In this example, the feature profile 265 is a profile that detects license plates. In this example, the vehicle has a license plate "GJB100" that is detected by the ACPD 206. Each of images T0, T1, and T2 is stored in the image storage buffer 242.

Figure 24:
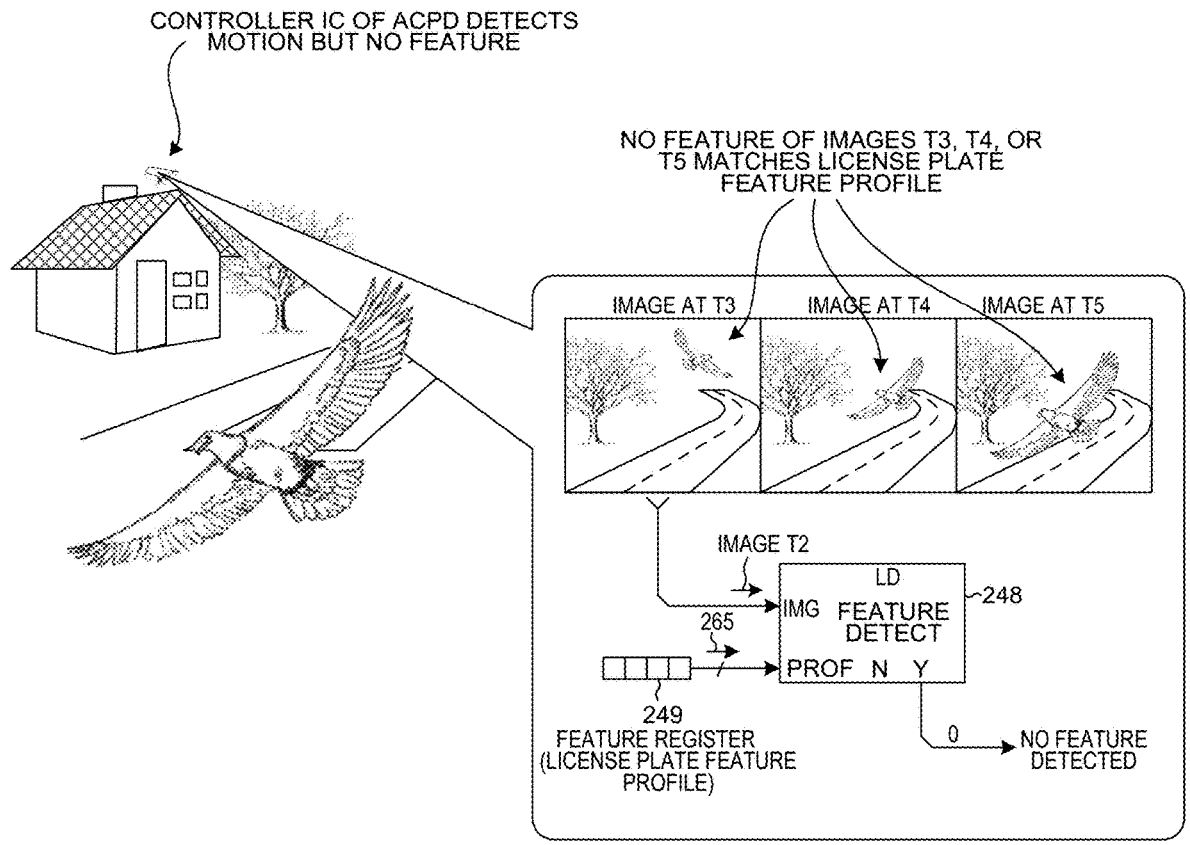
FIG. 24 is a perspective diagram that shows how the ACPD 206 detects motion but does not detect features.

FIG. 24 is a perspective diagram that shows how the ACPD 206 detects motion but does not detect features. In this example, an eagle that passes by the camera system 200 causes motion detect circuit 238 to detect motion. However, no license plate is detected by feature detect circuit 239.

Figure 25:
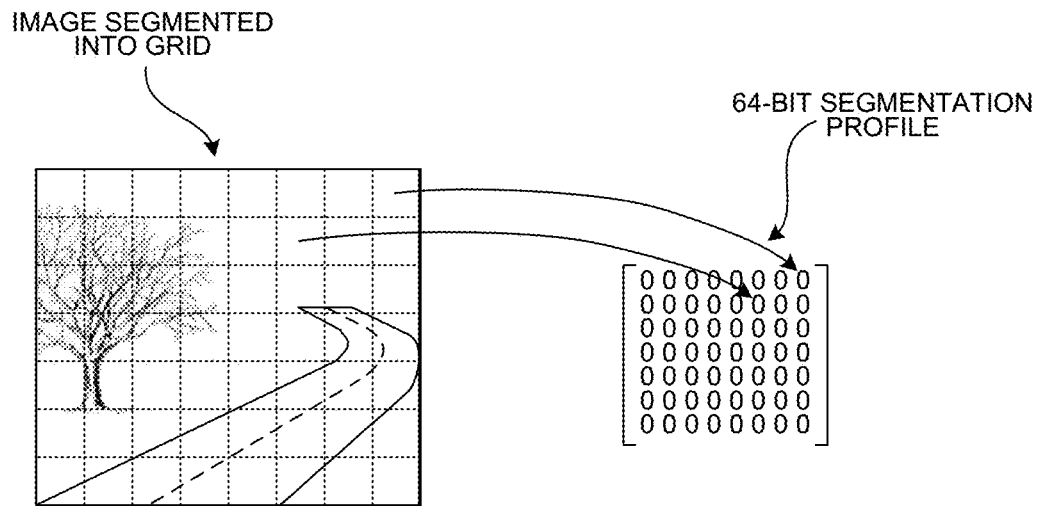
FIG. 25 is a diagram that shows how an image is segmented into a grid in accordance with a segmentation profile.

FIG. 25 is a diagram that shows how an image is segmented into a grid in accordance with a segmentation profile. In this example, the segmentation profile is a 64-bit value. Each bit of the 64-bit value corresponds to one segment of the grid overlaid above the image shown in FIG. 25. A digital logic high value indicates that the corresponding segment of the grid is to be masked and not accessible to other entities. A digital logic low value indicates that the corresponding segment of the grid is to be unmasked and is accessible to other entities.

Figure 26:
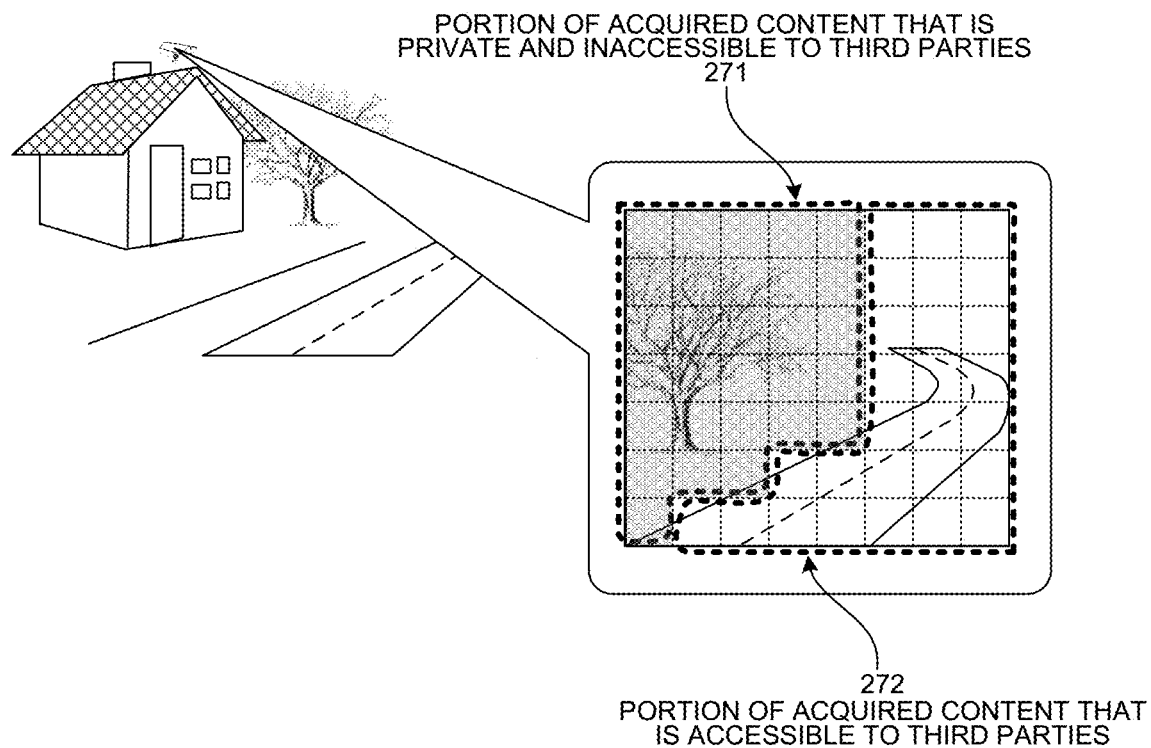
FIG. 26 shows a segmented portion of the image captured by camera system 200.

FIG. 26 shows a segmented portion of the image captured by camera system 200. In this example, reference numeral 271 indicates the portion of the image information that is to remain confidential and not shared with third parties. Portion 271 includes parts of a front lawn including a tree. It is typically undesirable for such private access ways to be accessible to third parties. Thus, portion 271 ought to remain masked and not accessible to other entities. Reference numeral 272 indicates the portion of the image information that is to be shared with third parties. Portion 272 includes a portion of the image that includes public access ways, such as the road shown in the image of FIG. 26.

Figure 27:
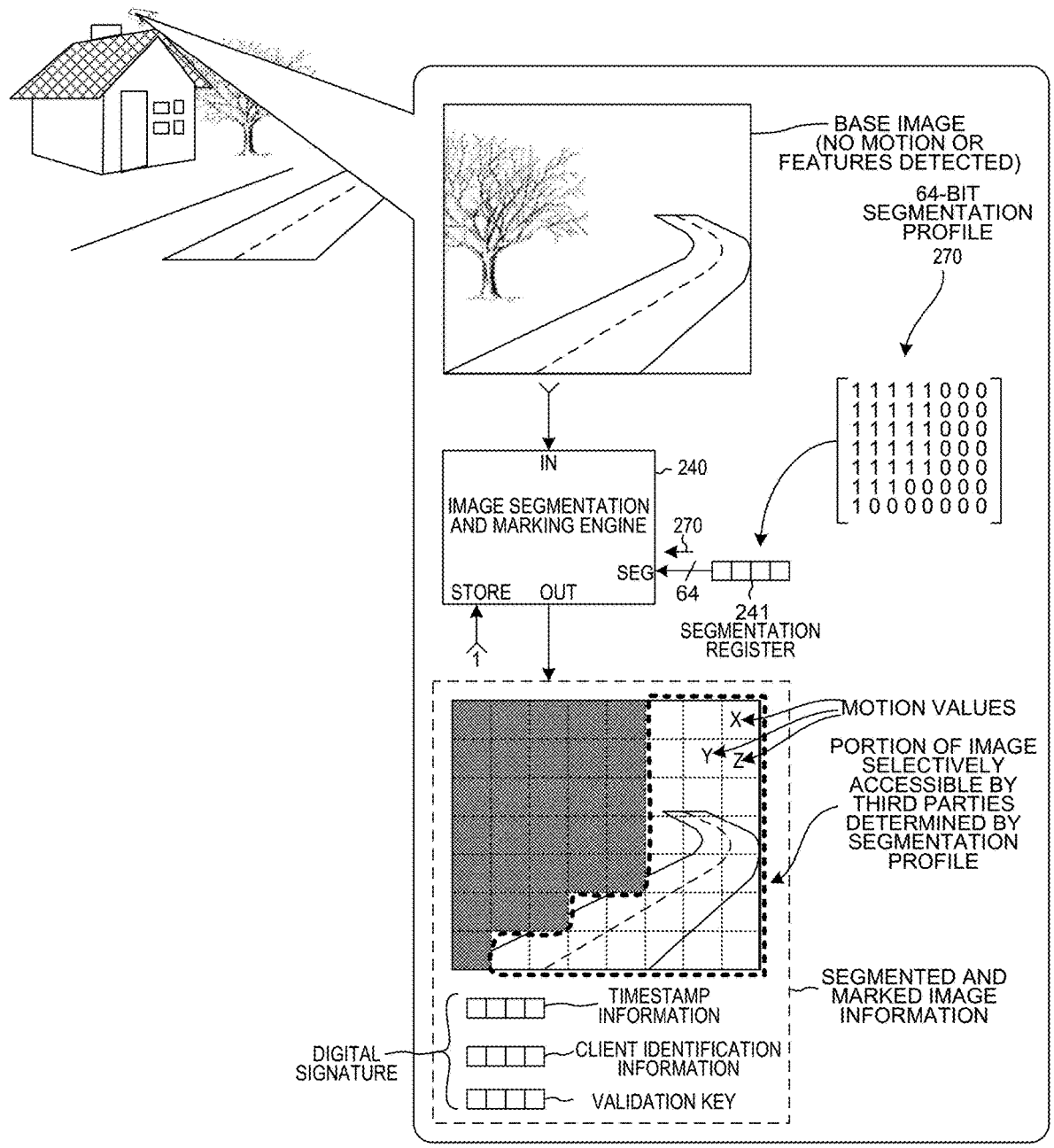
FIG. 27 shows how images are segmented and marked by the ACPD 206.

FIG. 27 shows how images are segmented and marked by ACPD 206. The images captured by the ACPD 206 are broken into grid areas. Each of the grid areas of the images is compared for differences and each assigned a motion value. For example, "X", "Y", and "Z" represent motions values for grid areas. These grid areas in sequential images which are below or above a specified motion value threshold are visibly or forensically marked with identifying data. The feature detector is configured to identify whether the at least one feature is present in the acquired image content. The grid area in each from which the feature is detected or not detected based on the motion value threshold is visibly or forensically marked with identification information in the sequence of captured frames that identifies the source of this captured video from this ACPD 206 and identifies which third party clients are receiving the feature information in the grid areas.

In one example, a grid on takes of individual still images from buffered acquisition data is imposed and data is compared with prior acquisition data to detect a state transition in that grid. The grid is adjustable to a desirable pixel resolution. Each grid location is analyzed in each consecutive picture or frame for differences. Each grid location is compared with the same grid and location in a sequence of pictures or frames captured by the ACPD 206. In pictures (or still images), these differences correspond to changes, and in video these changes correspond to motion.

ACPD 206 is configurable into a low motion marking mode and a high motion marking mode. If low motion marking mode is enabled, then at any point in which grid differences in sequential pictures or frames is less than a specified lower threshold for a preset duration length of time for consecutive number of frames or pictures, then the grid locations are noted alongside the picture or frame and stored in a marked buffered acquisition data. If high motion marking mode is enabled, then at the same time any difference in grids that are greater than a specified upper threshold are noted and the picture or frame is stored in the marked buffered acquisition data.

If feature detection is on, and if feature profiling is enabled and a desired feature is detected in the series of images which was passed to both marking and feature detecting functionality, then feature profile data is incorporated into these sequence of images in either the high or low threshold grids by means of a marking algorithm using a steganography method or other visible or invisible watermark used for images. A content of a mark applied by the marking algorithm may be any number of values taken from the group consisting of: a feature ID discovered in that sequence of marked frames, a customer ID of the outside party that is obtaining the data, a ACPD serial number, a random or sequential ID number, a date of the video, and a pre-configured digital signature. After the cache is full, then the acquired content is processed. All pictures or frames with grid noted as having met the lower threshold for the present duration length saved in the mark buffer acquisition data are flushed out to the transmit acquisition buffer. In additional, a limit on a number of cache flushes that comprise a complete video is configurable.

In one embodiment, the cache size (or length) is made large enough such that there are grid locations across groups of sequential pictures or frames that meet the lower threshold for preset durations. The value of these marks may be broken up into various bits or values spread across multiple frames and pictures using a redundant, correcting code or other algorithm, such as a Hamming code or a trellis code, that tolerates tampering and video modification such as cropping and sequence removal and editing. The information stored in this sequence of marks provides a robust tracking and identification system as well as a means of detecting editing and content modification such as removal or addition.

In other embodiments, the information about the location of the grids that met the specified maximum threshold for differences can be encoded and marked into the selected grids that met the lower threshold for the preset durations thereby providing a motion signature about the video embedded within itself. This combined with other information, are attributes that survive events such as copying, editing, re-encoding, re-transcoding that would otherwise be difficult to detect.

Figure 28:
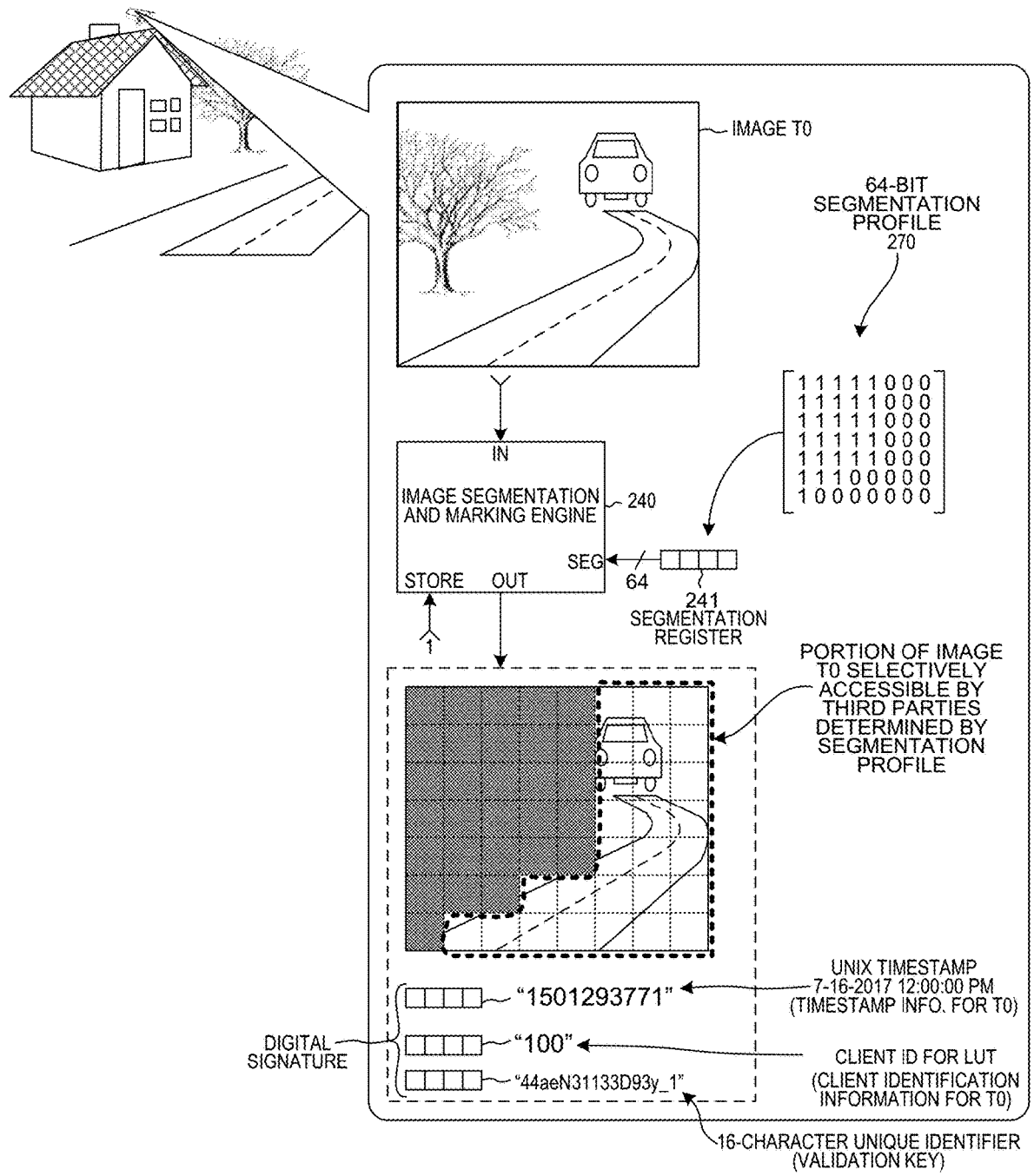
FIG. 28 shows how image T0 is segmented and marked by the ACPD 206 using segmentation profile 270.
Figure 29:
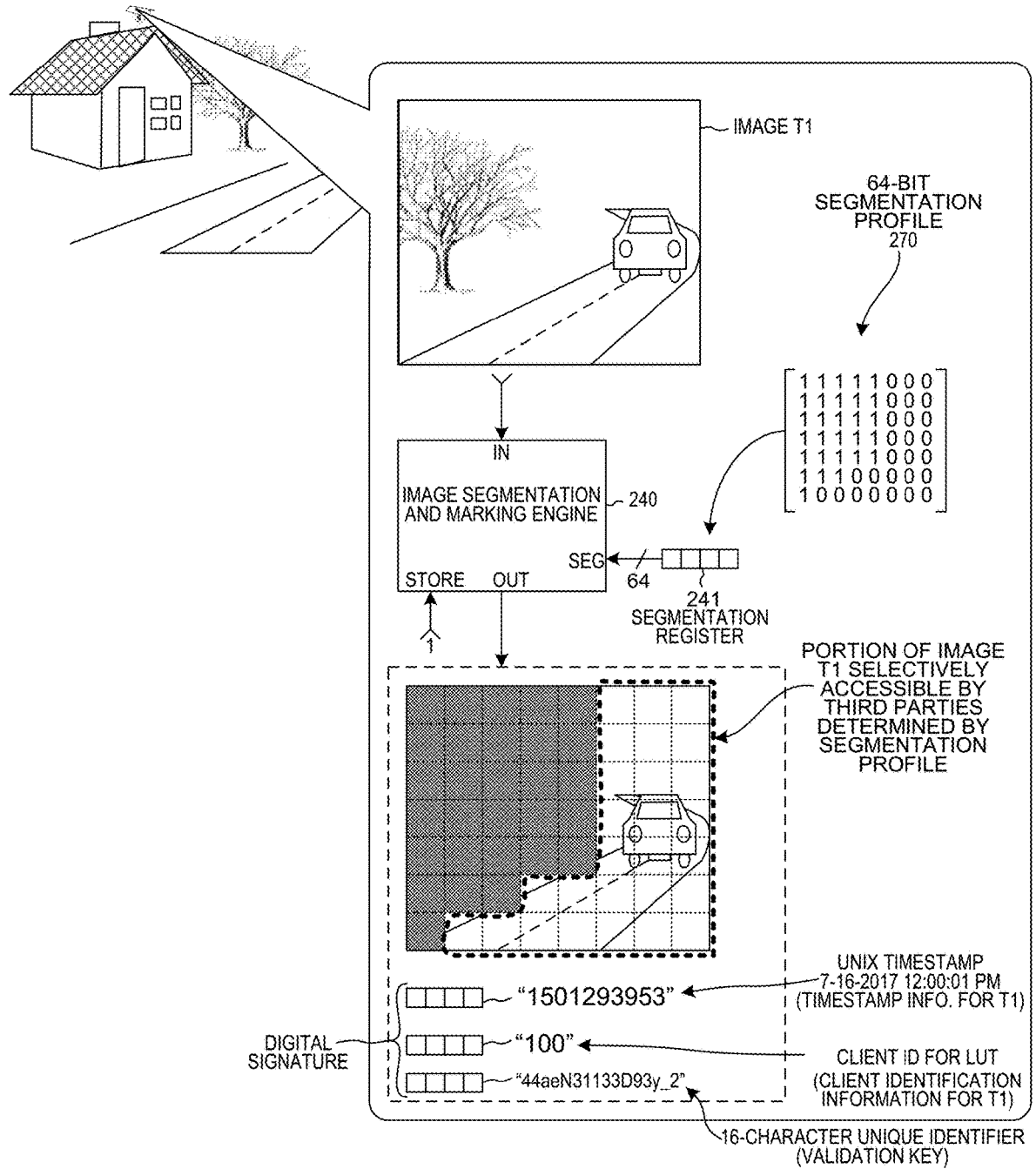
FIG. 29 shows how image T1 is segmented and marked by the ACPD 206 using segmentation profile 270.
Figure 30:
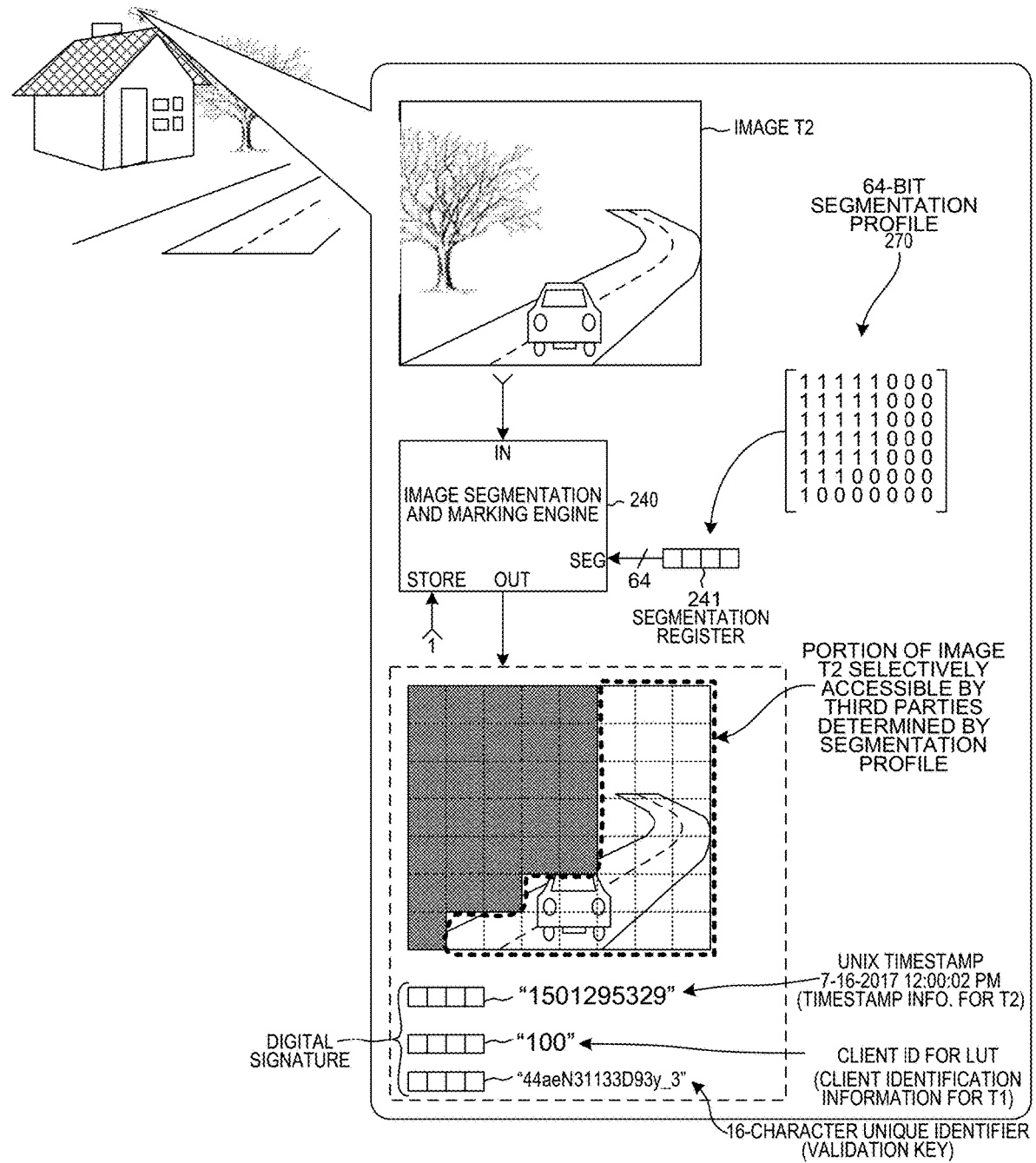
FIG. 30 shows how image T2 is segmented and marked by the ACPD 206 using segmentation profile 270.

FIGS. 28-30 show how the images T0, T1, and T2 are segmented and marked. The images T0, T1, and T2 are segmented based on the segmentation profile 270. The images T0, T1, and T2 are marked with a digital signature comprising a timestamp, an identification number, and a validation key. The digital signature validates and associates the images with an entity that owns and operates the camera system 200. The validation key is a unique token code.

Figure 31:
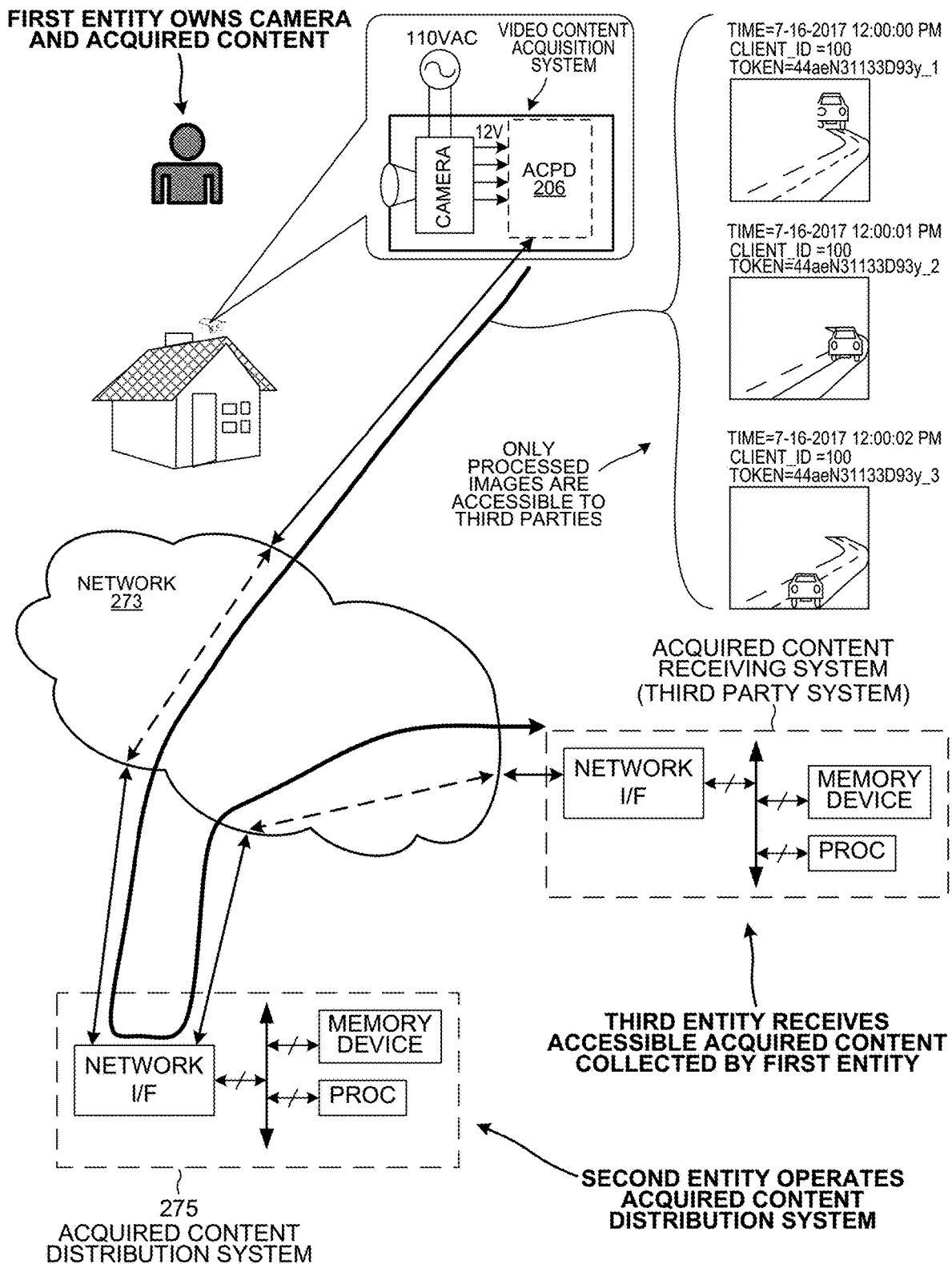
FIG. 31 is a diagram that shows how a first entity that owns the camera causes an accessible portion of the acquired content to be supplied to a third entity via an acquired content distribution system operated by a second entity.

FIG. 31 is a diagram that shows how a first entity that owns the camera causes an accessible portion of the acquired content to be supplied to a third entity via an acquired content distribution system operated by a second entity. The second entity manages an acquired content distribution system 275. A third entity contracts either directly with the first entity that owns the camera system 200 or through the second entity to obtain the publicly accessible portion of the acquired content. In exchange, the third entity typically provides financial compensation as consideration. Only acquired content captured by the camera system 200 that has been processed by ACPD 206 is accessible to third parties. The ACPD 206 ensures that the masked portions of the video acquired content will not be accessible to third parties.

In addition, the mark is a digital signature that validates and authenticates the source of the captured content. The digital signature also validates and authenticates an entity, such as the third entity as shown in FIG. 31, that is to receive the image information. The digital signature is used to determine if a sequence of the images is missing a digital signature. Each of images T0, T1, and T2 has token key of "44aeN31133D93y_1" indicating that all the images originated from the first entity, are successfully validated, and can be trusted. If, however, image T1 has a different token key, such as "11oJ19pzz7lpp0A2", then the third entity knows that the image T1 cannot be trusted and might have been tampered with or not from the camera owned by the first entity. The digital signatures ensure that third parties receiving the acquired content can trust the source and contents of the acquired content. This is especially important when the third party receiving the acquired content is a law enforcement agency.

The digital signature also is used to detect whether images have been omitted or are missing. The token key in the example of FIG. 31 includes a key and an appended underscore followed by an integer. The integer is incremented for each image. The integer indicates the frame in the sequence of images. The recipient can use the appended integers to determine whether an image is missing or if an image was not received. For example, if the recipient receives only marked image T0 having key "44aeN31133D93y_1" and marked image T2 having key "44aeN31133D93y_3", then the recipient will know that image T1 is missing because the appended keys are missing the key "44aeN31133D93y_2" of image T1.

In another example, the image segmentation and marking engine 240 has a serial number and a key value that may or may not be visible to the outside world after it is placed into the enclosure. This key value may be similar to that used by magic numbers and keys CRC's (Cyclic Redundancy Check), credit card sequence number and pin, 1VD5 encryption, PGP (Pretty Good Protection), SSH (Secure Shell) or other common algorithms. This serial number and key value is used in conjunction with the image segmentation and marking engine 240 to identify the source of the pictures/videos from this camera.

In yet another embodiment, the cache length can be made to be the entire duration of a video of a known length, making this method a two pass solution that marks the grid locations after the entire video has been ingested for processing. Each of the marks themselves are sequential in one frame after another in the same grid location, but multiple marks may be in various sequential grids that meet the lower threshold and preset duration length as depicted in this example. Each mark essentially sits in a static picture/image in a grid that is unchanged over the sequence that matches the low threshold, essentially allowing the marking engine to mark still picture portion of the video frame. All the pictures/frames in the cache are then flushed out the video stream interface I/O to storage or as a stream to the outside world. For additional information on the structure and operation of image segmentation and marking engine 240, and for additional detail on its constituent parts and how to make the engine, see: U.S. Provisional Patent Application Ser. No. 62/507,983, entitled "Graphics Processing Module For Authentication and Tracking of Pictures and Videos From Cameras", filed on May 18, 2017 (the entire subject matter of the above identified patent document is incorporated herein by reference).

Figure 32:
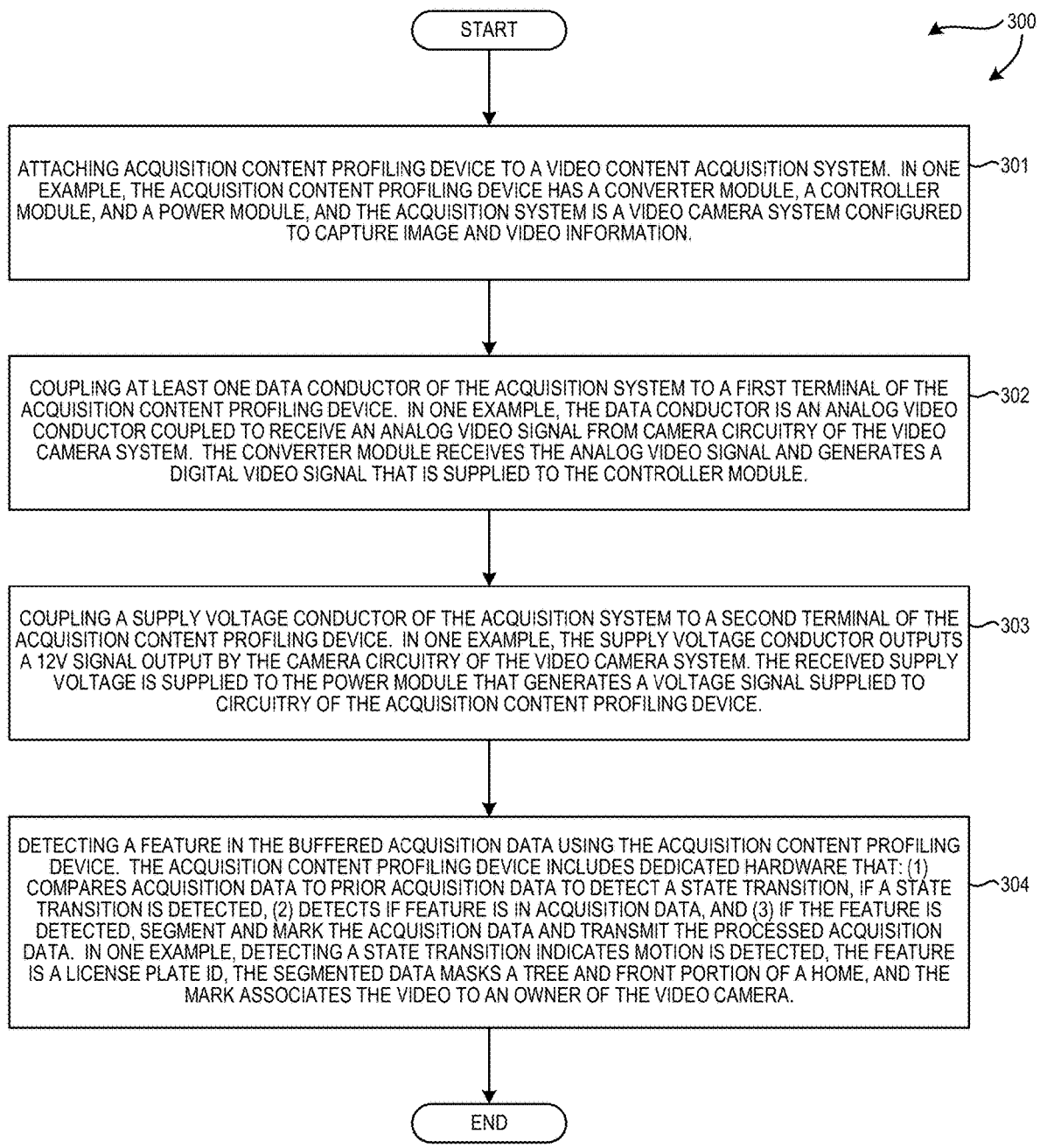
FIG. 32 is a flowchart of a method 300 in accordance with one novel aspect.

FIG. 32 is a flowchart of a method 300 in accordance with one novel aspect. In a first step (301), an acquisition content profiling device is attached to a video content acquisition system. In one example, the acquisition content profiling device has a converter module, a controller module, and a power module, and the acquisition system is a video camera system configured to capture image and video information.

In a second step (302), at least one data conductor of the acquisition system is coupled to a first terminal of the acquisition content profiling device. In one example, the data conductor is an analog video conductor coupled to receive an analog video signal from camera circuitry of the video camera system. The converter module receives the analog video signal and generates a digital video signal that is supplied to the controller module.

In a third step (303), a supply voltage conductor of the acquisition system is coupled to a second terminal of the acquisition content profiling device. In one example, the supply voltage conductor outputs a 12V signal output by the camera circuitry of the video camera system. The received supply voltage is supplied to the power module that generates a voltage signal supplied to circuitry of the acquisition content profiling device.

In a fourth step (304), a feature in the buffered acquisition data is detected using the acquisition content profiling device. The acquisition content profiling device includes dedicated hardware that: (1) compares acquisition data to prior acquisition data to detect a state transition, if a state transition is detected, (2) detects if feature is in acquisition data, and (3) if the feature is detected, segment and mark the acquisition data and transmit the processed acquisition data. In one example, detecting a state transition indicates motion is detected, the feature is a license plate ID, the segmented data masks a tree and front portion of a home, and the mark associates the video to an owner of the video camera.

Figure 33:
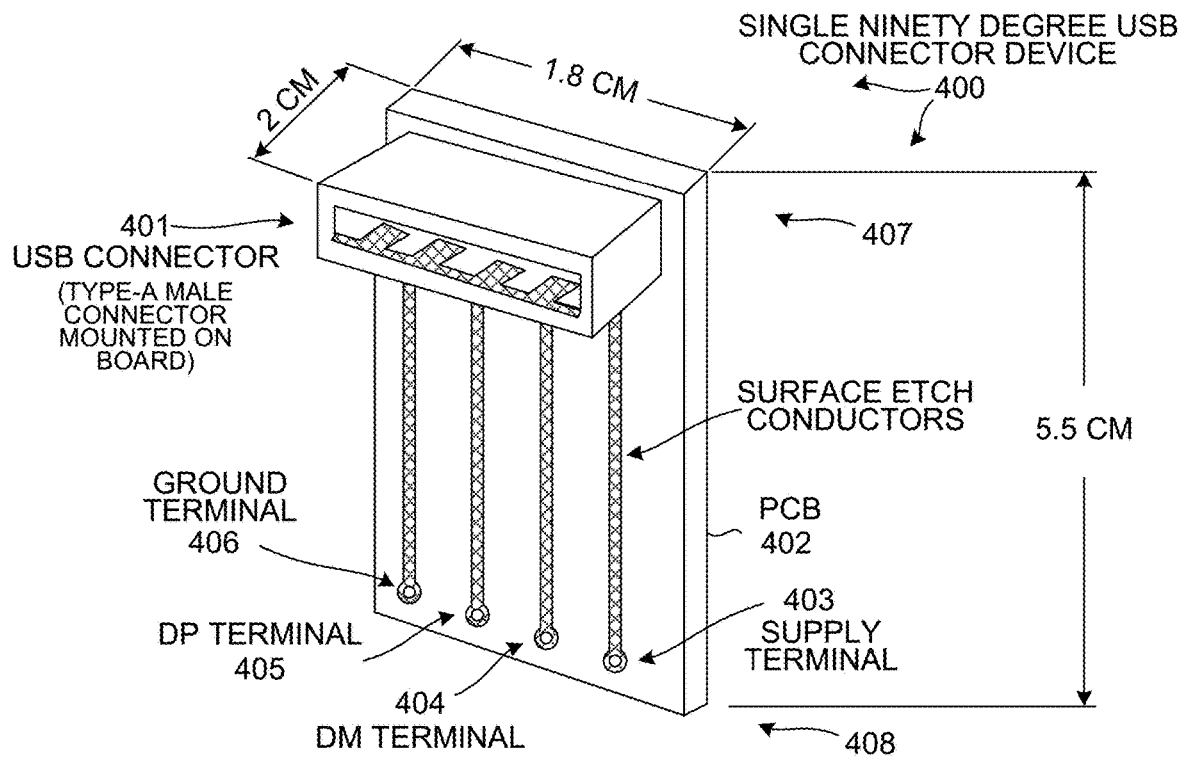
FIG. 33 is a diagram of a single port ninety degree USB connector device 400.

FIG. 33 is a diagram of a single port ninety degree USB connector device 400. The single port ninety degree USB connector device 400 has one and only one USB connector. The single port ninety degree USB connector device 400 comprises a USB connector 401 that is flush mounted onto a Printed Circuit Board (PCB) 402. The PCB 402 has a supply terminal 403, a USB DM terminal 404, a DP terminal 405, and a ground terminal 406. The terminals 403-406 are connected to respective conductors of the USB connector 401 via surface etch conductors. The PCB 402 has a rectangular shape and has an upper portion 407 and a lower portion 408. The upper portion 407 is opposite the lower portion 408. The USB connector 401 extends from the upper portion 407 to the lower portion 408 of the PCB 402. The surface etch conductors extend from the USB connector 401 to the lower portion 408 of the PCB 402. The USB connector 401 forms a ninety degree angle with respect to the PCB 402. The dimensions of the In this example, the USB connector 401 is a type-A connector. In another example, the USB connector 401 is a type-B connector. The single port ninety degree USB connector device 400 has dimensions equal to or less than 5.5 centimeters by 1.8 centimeters by 2.0 centimeters. In the example of FIG. 33, the single port ninety degree USB connector device 400 is 5.5 centimeters by 1.8 centimeters by 2.0 centimeters. The ninety degree USB connector device 400 compactly fits in tight spaces, such as in ACPD 206.

Figure 34:
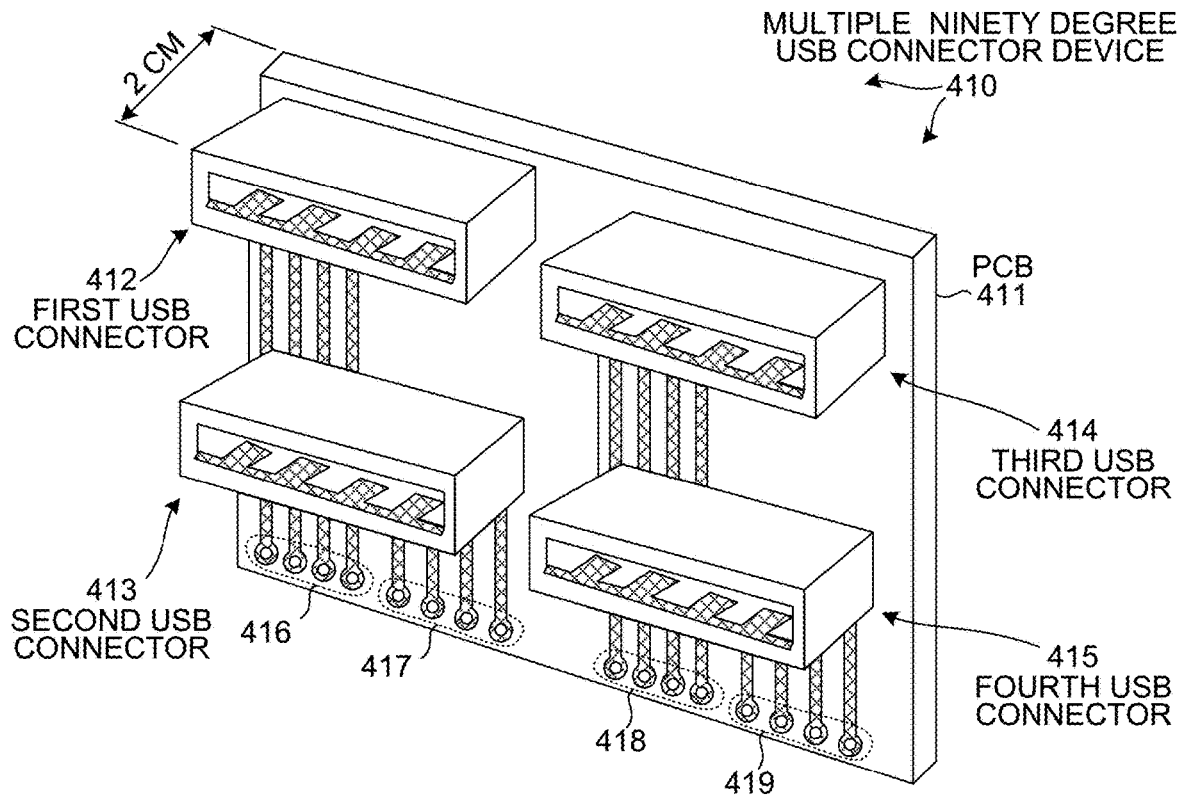
FIG. 34 is a diagram of a multiple port ninety degree USB connector device 410.

FIG. 34 is a diagram of a multiple port ninety degree USB connector device 410. The multiple port ninety degree USB connector device 410 has at least four USB connectors flush mounted onto a PCB board 411. The multiple port ninety degree USB connector device 410 has a first USB connector 412, a second USB connector 413, a third USB connector 414, and a fourth USB connector 415.

Each of the connectors 412-415 has conductors that are coupled to terminals disposed along a side of the PCB 411. A first plurality of terminals 416 is coupled to conductors of the first USB connector 412 via surface etch conductors or PCB traces. A second plurality of terminals 417 is coupled to conductors of the second USB connector 413 via surface etch conductors or PCB traces. A third plurality of terminals 418 is coupled to conductors of the third USB connector 414 via surface etch conductors or PCB traces. A fourth plurality of terminals 419 is coupled to conductors of the fourth USB connector 415 via surface etch conductors or PCB traces. Each group of terminals 416-419 has a supply terminal, a DM terminal, a DP terminal, and a ground terminal. The multiple port ninety degree USB connector device 410 has at least one dimension that is less than or equal to 5.5 centimeters. In this example, the multiple port ninety degree USB connector device 410 has a thickness less than or equal to 2.0 centimeters.

Figure 35:
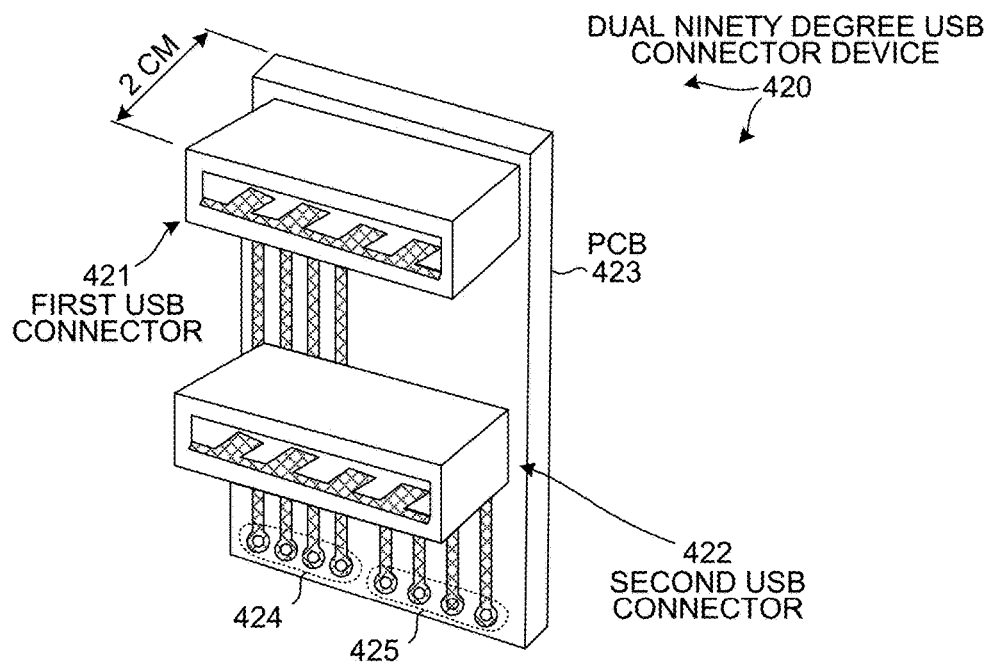
FIG. 35 is a perspective diagram of a dual ninety degree USB connector device 420.

FIG. 35 is a perspective diagram of a dual ninety degree USB connector device 420. The dual ninety degree USB connector device 420 has a first USB connector 421 and a second USB connector 422. Each of the first USB connector 421 and the second USB connector 422 is flush mounted onto the PCB 423 at an approximately ninety degree angle. A first plurality of terminals 424 is coupled to conductors of the first USB connector 421 via surface etch conductors or PCB traces. A second plurality of terminals 425 is coupled to conductors of the second USB connector 422 via surface etch conductors or PCB traces. Each group of terminals 424 and 425 has a supply terminal, a DM terminal, a DP terminal, and a ground terminal.

The dual port ninety degree USB connector device 420 has no more than two USB connectors. The first USB connector 421 is disposed above the second USB connector 422. The USB connectors 421 and 422 are vertically stacked. The dual port ninety degree USB connector device 420 has at least one dimension that is less than or equal to 5.5 centimeters. In this example, the dual port ninety degree USB connector device 420 has a thickness less than or equal to 2.0 centimeters.

Figure 36:
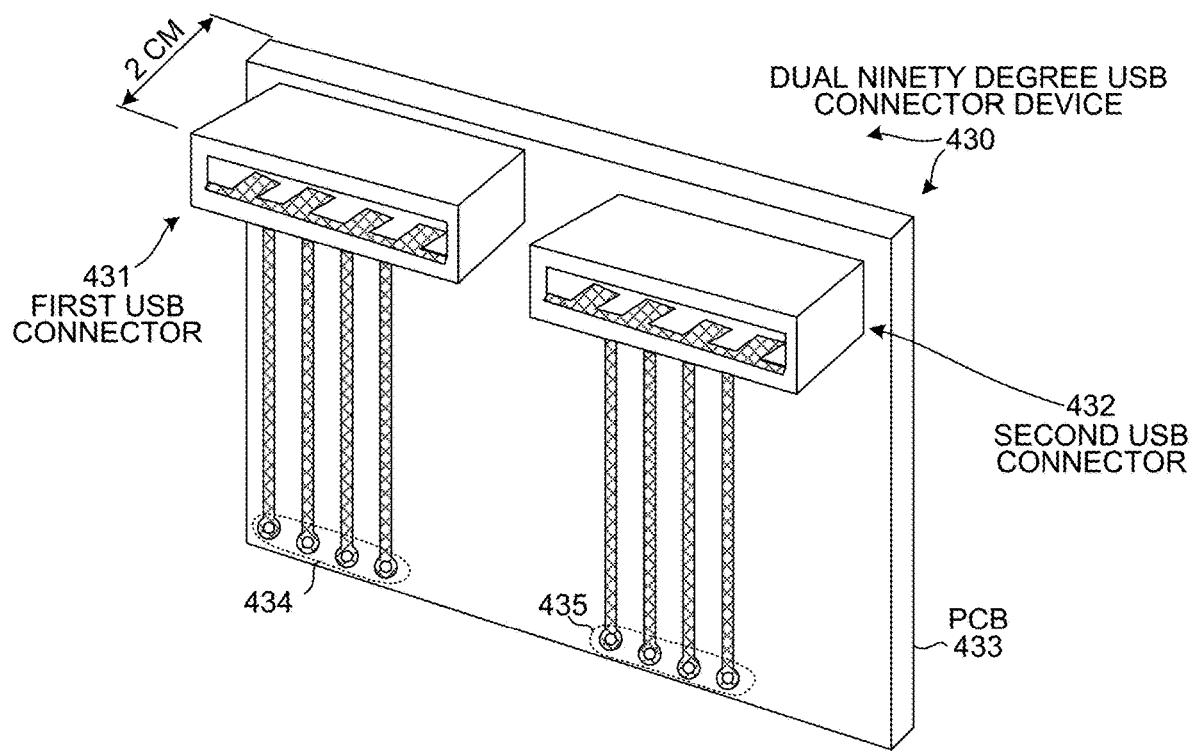
FIG. 36 is a perspective diagram of another embodiment of a dual ninety degree USB connector device 430.

FIG. 36 is a perspective diagram of another embodiment of a dual ninety degree USB connector device 430. The dual ninety degree USB connector device 430 has a first USB connector 431 and a second USB connector 432. Each of the first USB connector 431 and the second USB connector 432 is flush mounted onto the PCB 433 at an approximately ninety degree angle. A first plurality of terminals 434 is coupled to conductors of the first USB connector 431 via surface etch conductors or PCB traces. A second plurality of terminals 435 is coupled to conductors of the second USB connector 432 via surface etch conductors or PCB traces. Each group of terminals 434 and 435 has a supply terminal, a DM terminal, a DP terminal, and a ground terminal.

The dual port ninety degree USB connector device 430 has no more than two USB connectors. The USB connectors 431 and 432 are horizontally aligned. The first USB connector 431 is disposed adjacent to the second USB connector 432. The dual port ninety degree USB connector device 430 has at least one dimension that is less than or equal to 5.5 centimeters. In this example, the dual port ninety degree USB connector device 430 has a thickness of 2.0 centimeters.

Although certain specific embodiments are described above for instructional purposes, the teachings of this patent document have general applicability and are not limited to the specific embodiments described above. The function of the hardware circuitry illustrated in FIGS. 11 and 18 can be implemented in hardware circuitry as shown, or in a combination of dedicated hardware circuitry and software, or largely in software. This applies to individual blocks or portions of the diagrams. For example, a counter such as counter of FIG. 18 can be a hardware counter, or can be a counter implemented in software code. Certain of the illustrated blocks can be implemented with dedicated hardware and other ones of the blocks can be implemented in software. Accordingly, various modifications, adaptations, and combinations of various features of the described embodiments can be practiced without departing from the scope of the invention as set forth in the claims.

What is claimed is:

1. An apparatus comprising:
a first terminal that couples to an analog video signal conductor of a video content acquisition system;
a second terminal that couples to a voltage conductor of the video content acquisition system;
an analog-to-digital converter (ADC) that receives the analog video signal from the analog video signal conductor, wherein the ADC generates a digital video signal from the received analog video signal, and wherein an amount of images are extractable from the digital video signal;
a controller that receives the digital video signal generated by the ADC, wherein the controller detects a feature in at least one of the images, and wherein the controller comprises:
an environment filter circuit that compensates for undesirable weather conditions;
a motion detector circuit that detects motion by comparing images, wherein the motion detector circuit receives a first image and a second image, wherein the first image is captured by the video content acquisition system at a first time, wherein the second image is captured by the video content acquisition system at a second time, and wherein the second time occurs after the first time;
a feature detector circuit that detects at least one feature in an image; and
an image segmentation and marking engine that segments and marks at least one image, wherein the image segmentation and marking engine segments a first image and a second image into grid areas, wherein each of the grid areas of the first image and the second image is compared for differences and each assigned a motion value, wherein these grid areas in sequential images which are below or above a specified motion value threshold are visibly or forensically marked with identifying data, and wherein the mark is a digital signature that indicates a source of the captured content and also indicates an entity that is to receive image information; and a power circuit that receives an input voltage signal from the voltage conductor of the video content acquisition system via the second terminal and generates a first supply voltage signal and a second supply voltage signal, wherein the input voltage signal is received onto an input terminal of the power circuit, wherein the first supply voltage signal is supplied onto a first output terminal of the power circuit, wherein the second supply voltage signal is supplied onto a second output terminal of the power circuit, wherein the first supply voltage signal has a first voltage level, wherein the second supply voltage signal has a second voltage level, wherein the first voltage level is different from the second voltage level % and wherein the power circuit supplies each of the ADC and the controller using either the first supply voltage signal or the second supply voltage signal.

2. The apparatus of claim 1, wherein the apparatus fits within a volume having a first dimension, a second dimension, and a third dimension, wherein the first dimension is less than or equal to 7.0 centimeters, wherein the second dimension is less than or equal to 10.0 centimeters, and wherein the third dimension is less or equal to 5.0 centimeters.

3. The apparatus of claim 1, wherein the apparatus is an acquisition content profiling device (ACPD), wherein video content acquisition system is selected from the group consisting of: an analog video camera system that generates and outputs analog video signals and a digital video camera system that generates and outputs digital video signals, and wherein the ACPD processes analog video signals or digital video signals.

4. The apparatus of claim 3, wherein the analog video camera system has an enclosure, and wherein the apparatus is disposed within the enclosure of the analog video camera system.

5. The apparatus of claim 1, wherein the controller has an amount of dedicated hardware that detects the feature in at least one of the images, and wherein the controller comprises hardware taken from the group consisting of an application specific integrated circuit (ASIC), a graphics processing unit (GPU), an integrated circuit having an amount of combinational logic circuitry, an integrated circuit having an amount of sequential logic circuitry, and an integrated circuit having an amount of sequential logic circuitry and an amount of combinational logic circuitry.

6. The apparatus of claim 1, wherein the apparatus further comprises:
a support attachment adapted to receive the controller, the ADC, and the power circuit, and wherein the support attachment is adapted to maintain the controller module, the ADC, and the power circuit attached to the video content acquisition system.

7. The apparatus of claim 6, wherein the support attachment includes a first opening, a second opening, and a third opening, wherein the first opening receives a first analog video signal conductor plug, wherein the second opening receives an analog audio left signal conductor plug, and wherein the third opening receives an analog audio right signal conductor plug.

8. The apparatus of claim 1, wherein the apparatus further comprises:
a ninety degree Universal Serial Bus (USB) connector, wherein the ninety degree USB connector includes at least one conductor, wherein the ninety degree USB connector connects the ADC to the controller such that the digital video signal is communicated from the ADC to the controller via the at least one conductor of the ninety degree USB connector.

9. The apparatus of claim 1, wherein the feature detector identifies whether the at least one feature is present in the first image, and wherein the feature detector identifies whether the at least one feature is present in the second image.

10. The apparatus of claim 1, wherein if the controller detects a feature in at least one of the images, then the controller causes an amount of images to be communicated wirelessly via a wireless circuit.

11. The apparatus of claim 1, wherein the apparatus is an acquisition content profiling device (ACPD), and wherein the video content acquisition system is retrofitted to include the ACPD.

12. An apparatus comprising:
a first terminal that couples to an analog video signal conductor of a video content acquisition system;
a second terminal that couples to a voltage conductor of the video content acquisition system;
an analog-to-digital converter (ADC) that receives the analog video signal from the analog video signal conductor, wherein the ADC generates a digital video signal from the received analog video signal, and wherein an amount of images are extractable from the digital video signal;
a controller that receives the digital video signal generated by the ADC, wherein the controller detects a feature in at least one of the images, and wherein the controller comprises:
an environment filter circuit that compensates for undesirable weather conditions;
a motion detector circuit that detects motion by comparing images, wherein the motion detector circuit receives a first image and a second image, wherein the first image is captured by the video content acquisition system at a first time, wherein the second image is captured by the video content acquisition system at a second time, and wherein the second time occurs after the first time;
a feature detector circuit that detects at least one feature in an image, wherein the feature detector identifies whether the at least one feature is present in the first image, and wherein the feature detector identifies whether the at least one feature is present in the second image, wherein the grid area in each from which the feature is detected or not detected based on the motion value threshold is visibly or forensically marked with identification information in the sequence of captured frames that identifies the source of this captured video from this ACPD and identifies which third party clients are receiving the feature information in the grid areas; and
an image segmentation and marking engine that segments and marks at least one image; and
a power circuit that receives an input voltage signal from the voltage conductor of the video content acquisition system via the second terminal and generates a first supply voltage signal and a second supply voltage signal, wherein the input voltage signal is received onto an input terminal of the power circuit, wherein the first supply voltage signal is supplied onto a first output terminal of the power circuit, wherein the second supply voltage signal is supplied onto a second output terminal of the power circuit, wherein the first supply voltage signal has a first voltage level, wherein the second supply voltage signal has a second voltage level, wherein the first voltage level is different from the second voltage level, and wherein the power circuit supplies each of the ADC and the controller using either the first supply voltage signal or the second supply voltage signal.

13. A method comprising:
attaching an acquisition content profiling device to a video content acquisition system, wherein the acquisition content profiling device has a converter, a controller, and a power circuit, and wherein the power circuit has an input terminal, a first output terminal, and a second output terminal;
coupling at least one data conductor of the video content acquisition system to a first terminal of the acquisition content profiling device;
coupling a supply voltage conductor of the video content acquisition system to a second terminal of the acquisition content profiling device;
using the power circuit to generate a first supply voltage on the first output terminal and to generate a second supply voltage on the second output terminal, wherein the first supply voltage has a first voltage level, wherein the second supply voltage has a second voltage level, wherein the first voltage level is different from the second voltage level, and wherein the power circuit supplies circuitry within the acquisition content profiling device; and
using the ACPD to attach a forensic mark to captured content obtained by the video content acquisition system, wherein the forensic mark is a digital signature that indicates a source of the captured content and also indicates an entity that is to receive the captured content.

14. A method comprising:
attaching an acquisition content profiling device to a video content acquisition system, wherein the acquisition content profiling device has a converter, a controller, and a power circuit;
coupling at least one data conductor of the video content acquisition system to a first terminal of the acquisition content profiling device;
coupling a supply voltage conductor of the video content acquisition system to a second terminal of the acquisition content profiling device;
detecting a feature in the buffered acquisition data using the acquisition content profiling device; and
marking grid areas in the buffered acquisition data with a visible or forensic mark using the acquisition content profiling device, wherein the marking comprises:
imposing a grid on takes of individual still images from buffered acquisition data and comparing data with prior acquisition data to detect a state transition in that grid, wherein the grid is adjustable to a desirable pixel resolution;
analyzing each grid location in each consecutive picture or frame for differences, wherein each grid location is compared with the same grid and location in a sequence of pictures or frames, wherein in pictures these differences correspond to changes, and wherein in video these changes correspond to motion;
if low motion marking is enabled, at any point in which grid differences in sequential pictures or frames is less than a specified lower threshold for a preset duration length of time for consecutive number of frames or pictures, then the grid locations are noted alongside the picture or frame and stored in a marked buffered acquisition data, and wherein if high motion marking is enabled, then at the same time any difference in grids that are greater than a specified upper threshold are noted and the picture or frame is also stored in the marked buffered acquisition data;
if feature detection is on and feature profiling is enabled, and a desired feature is detected in the series of images which was passed to both marking and feature detecting functionality, then feature profile data is incorporated into these sequence of images in either the high or low threshold grids by means of a marking algorithm using a steganography method or other visible or invisible watermark used for images, and wherein a content of a mark applied by the marking algorithm may be any number of values taken from the group consisting of: a feature identifier discovered in that sequence of marked frames, a customer identifier of the outside party that is obtaining the data, a ACPD serial number, a random or sequential identifier number, a date of the video, and a pre-configured digital signature; and
after a cache is full, acquired content is processed, wherein all pictures or frames with grid noted as having met the lower threshold for the present duration length saved in the mark buffer acquisition data are flushed out to the transmit acquisition buffer, wherein a limit on a number of cache flushes that comprise a complete video is configurable.

15. The method of claim 14, wherein the detecting comprises:
comparing acquisition data to prior acquisition data to detect a state transition;
if a state transition is detected, detecting whether a feature is present in the acquisition data; and
if the feature is detected, transmitting the buffered acquisition data wirelessly.

16. The method of claim 14, wherein the acquisition system is a video camera system that captures image and video information, and wherein the power circuit of the acquisition content profiling device is supplied only by the supply voltage conductor of the video camera system.

17. The method of claim 16, wherein the data conductor is an analog video conductor coupled to receive an analog video signal from camera circuitry of the video camera system.

* * * * *